(12) United States Patent
Giemza

(10) Patent No.: US 12,286,993 B2
(45) Date of Patent: Apr. 29, 2025

(54) CONNECTING DEVICE

(71) Applicant: Gripple Limited, Sheffield (GB)

(72) Inventor: Lee Giemza, Sheffield (GB)

(73) Assignee: Gripple Limited (GB)

( * ) Notice: Subject to any disclaimer, the term of this patent is extended or adjusted under 35 U.S.C. 154(b) by 242 days.

(21) Appl. No.: 17/599,451

(22) PCT Filed: May 4, 2020

(86) PCT No.: PCT/IB2020/054197
§ 371 (c)(1),
(2) Date: Sep. 28, 2021

(87) PCT Pub. No.: WO2020/229937
PCT Pub. Date: Nov. 19, 2020

(65) Prior Publication Data
US 2022/0196057 A1    Jun. 23, 2022

(30) Foreign Application Priority Data

May 11, 2019 (GB) ....................................... 1906663
Oct. 25, 2019 (GB) ....................................... 1915523
Apr. 24, 2020 (GB) ....................................... 2006024

(51) Int. Cl.
*F16B 19/02* (2006.01)
*F16B 2/08* (2006.01)
(Continued)

(52) U.S. Cl.
CPC ................ *F16B 19/02* (2013.01); *F16B 2/08* (2013.01); *F16B 21/02* (2013.01); *F16B 37/046* (2013.01);
(Continued)

(58) Field of Classification Search
CPC .. F16B 19/02; F16B 2/08; F16B 21/02; F16B 37/046; F16L 3/2431; F16L 3/04;
(Continued)

(56) References Cited

U.S. PATENT DOCUMENTS 2,345,279 A   3/1944   Morehouse
2,426,708 A   9/1947   Robertson
(Continued)

FOREIGN PATENT DOCUMENTS

EP    2475911 A1   7/2012
FR    2009847 A6   2/1970
(Continued)

OTHER PUBLICATIONS

First Examination Report issued by Intellectual Property India in connection with a corresponding foreign application on Sep. 13, 2023.
(Continued)

*Primary Examiner* — Jason W San
*Assistant Examiner* — Matthew J Sullivan
(74) *Attorney, Agent, or Firm* — Clark Hill PLC; James R. Foley

(57) ABSTRACT

A connecting device (10) is disclosed for connecting an article (12) to a support (14). The connecting device (10) comprises a flexible elongate member (20) and a clamping arrangement (18) for clamping the flexible elongate member (20) around the article (12). The clamping arrangement (18) comprises a body (22) and a clamping element (34). The clamping element (34) is movable between clamping and non-clamping positions. In the clamping position, the clamping element (34) clamps the flexible elongate member (20) to the body (22), thereby attaching the article (12) to the (Continued)

clamping arrangement (18). In the non-clamping position, the flexible elongate member (20) is movable through the body (22).

21 Claims, 38 Drawing Sheets

(51) Int. Cl.
| | |
|---|---|
| *F16B 21/02* | (2006.01) |
| *F16B 37/04* | (2006.01) |
| *F16G 11/10* | (2006.01) |
| *F16L 3/04* | (2006.01) |
| *F16L 3/10* | (2006.01) |
| *F16L 3/137* | (2006.01) |
| *F16L 3/24* | (2006.01) |
| *F16M 11/04* | (2006.01) |

(52) U.S. Cl.
CPC ............. *F16G 11/106* (2013.01); *F16L 3/04* (2013.01); *F16L 3/1058* (2013.01); *F16L 3/137* (2013.01); *F16L 3/2431* (2019.08); *F16M 11/041* (2013.01); *F16M 11/045* (2013.01); *F16M 2200/027* (2013.01)

(58) Field of Classification Search
CPC ...... F16L 3/1058; F16L 3/137; F16M 11/041; F16M 11/045; F16M 2200/027
See application file for complete search history.

(56) References Cited

U.S. PATENT DOCUMENTS

| | | | | |
|---|---|---|---|---|
| 3,532,311 | A * | 10/1970 | Havener | F16L 3/2431 24/339 |
| 3,628,221 | A | 12/1971 | Pasbrig | |
| 3,698,042 | A * | 10/1972 | Hirschhorn | F16G 11/06 24/115 G |
| 4,458,385 | A * | 7/1984 | Espinoza | F16B 2/08 24/17 AP |
| 4,510,650 | A * | 4/1985 | Espinoza | H02G 3/32 24/17 AP |
| 4,665,590 | A * | 5/1987 | Udelhofen | F16G 11/106 24/30.5 R |
| 4,678,147 | A * | 7/1987 | Barnes | F16L 1/20 24/339 |
| 4,768,741 | A | 9/1988 | Logsdon | |
| 4,794,673 | A * | 1/1989 | Yamaguchi | F16G 11/101 24/543 |
| 4,813,105 | A * | 3/1989 | Espinoza | B65D 63/16 248/74.3 |
| 4,878,270 | A * | 11/1989 | Westerkamp | F16G 11/04 24/132 R |
| 5,042,114 | A * | 8/1991 | Parrish | F16L 3/233 24/17 AP |
| 5,291,637 | A * | 3/1994 | Meyers | F16L 3/233 24/20 R |
| 5,402,557 | A | 4/1995 | Dalen | |
| 5,423,644 | A * | 6/1995 | First, Sr. | A44B 11/14 24/68 CD |
| 5,671,505 | A * | 9/1997 | Anscher | F16G 11/101 24/136 R |
| 5,745,959 | A * | 5/1998 | Dodge | A63C 10/06 24/71 SK |
| 5,779,259 | A * | 7/1998 | Lin | A43C 11/1466 280/623 |
| 5,862,964 | A * | 1/1999 | Moliner | B60R 9/058 224/322 |
| 5,894,639 | A * | 4/1999 | Boden | F16G 11/106 24/115 M |
| 6,126,122 | A | 10/2000 | Ismert | |
| 6,185,303 | B1 * | 2/2001 | Losey | A47B 96/06 379/453 |
| 6,347,817 | B1 * | 2/2002 | Chou | B60P 7/15 292/DIG. 60 |
| 6,374,464 | B1 * | 4/2002 | Lai | A43C 11/1406 24/68 SK |
| 6,386,488 | B1 * | 5/2002 | Menachem | F16L 3/2431 248/62 |
| 6,457,214 | B1 * | 10/2002 | Boden | F16G 11/101 24/136 L |
| 6,898,825 | B1 * | 5/2005 | Charest | F16L 33/035 24/16 PB |
| 7,032,415 | B2 * | 4/2006 | Young | A44B 11/125 70/69 |
| 8,281,462 | B2 * | 10/2012 | Kuhne | B65D 63/1063 24/17 AP |
| 8,434,979 | B1 * | 5/2013 | Genge | B61D 45/001 410/103 |
| 8,522,402 | B1 * | 9/2013 | Spooler | B60P 7/0846 24/68 E |
| 8,683,959 | B2 * | 4/2014 | Friedland | E05B 37/025 119/793 |
| 8,763,211 | B1 * | 7/2014 | Yu | B60P 7/0823 24/69 ST |
| 8,938,862 | B2 * | 1/2015 | Grasso | B60P 7/083 24/170 |
| 8,955,198 | B2 * | 2/2015 | Carnevali | B65D 63/1063 24/17 AP |
| 9,010,824 | B2 * | 4/2015 | Hayes | B65G 7/12 294/156 |
| 9,068,674 | B1 * | 6/2015 | Mangone, Jr. | F16L 3/1211 |
| 9,155,359 | B1 * | 10/2015 | Bailey | A44B 11/065 |
| 9,185,948 | B2 * | 11/2015 | Ben-Arie | A43C 7/04 |
| 9,199,571 | B2 * | 12/2015 | Leung | B60P 7/0823 |
| 9,388,606 | B2 * | 7/2016 | Garthe | E05B 67/003 |
| 9,546,744 | B2 * | 1/2017 | Patil | F16L 3/1083 |
| 9,709,191 | B2 * | 7/2017 | Brunet | F16L 1/205 |
| 10,070,701 | B1 * | 9/2018 | Liu | A44B 11/125 |
| 10,648,536 | B2 * | 5/2020 | Truesdell | A63B 27/00 |
| 10,718,364 | B2 * | 7/2020 | Isom | F16B 2/10 |
| 10,786,048 | B2 * | 9/2020 | Dee | A44B 11/10 |
| 10,801,581 | B2 * | 10/2020 | Ranum | F16G 11/106 |
| 11,339,852 | B1 * | 5/2022 | Austin | F16G 11/106 |
| 11,359,695 | B2 * | 6/2022 | Janssens | F16G 11/106 |
| 11,510,460 | B2 * | 11/2022 | Hipp | A43C 11/16 |
| 11,677,227 | B2 * | 6/2023 | Rouleau | H02G 3/32 248/74.3 |
| 2003/0019080 | A1 * | 1/2003 | Anthony | A44B 11/14 24/68 R |
| 2006/0130286 | A1 | 6/2006 | Igarashi et al. | |
| 2011/0000057 | A1 * | 1/2011 | Abdul | A43C 11/146 24/68 E |
| 2012/0017400 | A1 * | 1/2012 | Ussher | F16G 11/106 24/136 L |
| 2012/0085609 | A1 * | 4/2012 | Ostrow | A45C 13/30 190/102 |
| 2014/0150222 | A1 * | 6/2014 | Sautter | B60P 7/083 24/69 CT |
| 2018/0340592 | A1 | 11/2018 | Truesdell et al. | |
| 2019/0040884 | A1 * | 2/2019 | He | E05C 7/04 |
| 2020/0248781 | A1 * | 8/2020 | Patterson | F16G 11/101 |
| 2020/0347911 | A1 * | 11/2020 | Chih | F16G 11/105 |
| 2022/0032432 | A1 * | 2/2022 | Düll | F16B 21/086 |
| 2022/0196057 | A1 * | 6/2022 | Giemza | F16B 21/02 |
| 2023/0193978 | A1 * | 6/2023 | Enger | F16G 11/106 70/18 |
| 2024/0034529 | A1 * | 2/2024 | Kato | B65D 63/1027 |

FOREIGN PATENT DOCUMENTS

| | | |
|---|---|---|
| JP | S47-009120 | 4/1972 |
| JP | S63-017306 | 2/1988 |
| JP | H01-501919 | 7/1989 |
| JP | 2006-174613 | 6/2006 |

(56) References Cited

FOREIGN PATENT DOCUMENTS

| | | |
|---|---|---|
| WO | 2011/030082 | 3/2011 |
| WO | 2011/030082 A1 | 3/2011 |

OTHER PUBLICATIONS

Office Action (Examination Result) issued by United Arab Emirates' Ministry of Economy in connection with a corresponding foreign application on Sep. 5, 2023.

* cited by examiner

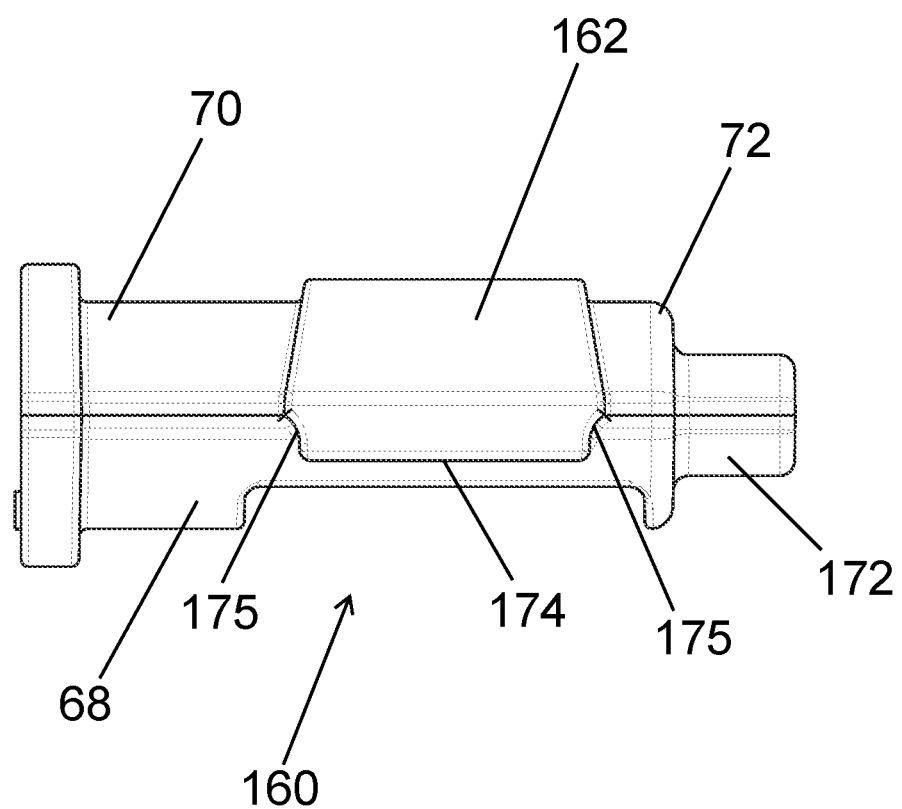
Fig 24(iii)

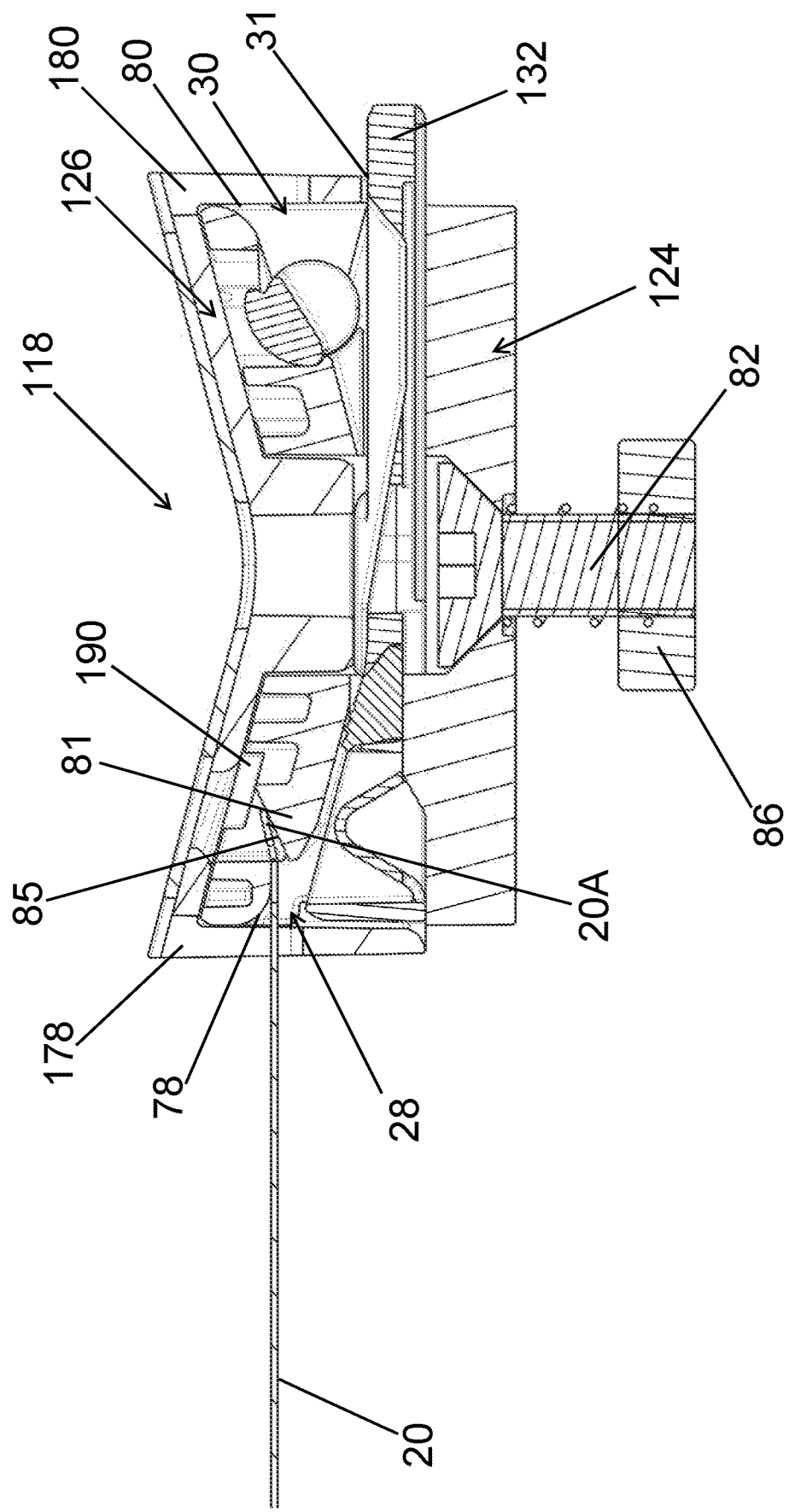
Fig 27(iii)

CONNECTING DEVICE

This invention relates to connecting devices. More particularly, but not exclusively, this invention relates to connecting devices for connecting elongate articles to elongate supports. Embodiments of the invention relate to connecting devices for connecting pipes to struts Pipes, and other elongate articles, are often installed in buildings close to the roof or ceiling. The pipe, or other article, is generally secured to carrying struts by means of connecting devices. There may be a large number of such struts, which can result in the installation being very time consuming. In addition, specific clamps to fit the outer diameter of the pipes with or without insulation may also be required.

According to one aspect of this invention, there is provided a connecting device for connecting an article to a support, the connecting device comprising: a flexible elongate member; and a clamping arrangement for clamping the flexible elongate member around the article; the clamping arrangement comprising a body and a clamping element, the clamping element being movable between clamping and non-clamping positions; wherein, in the clamping position, the clamping element clamps the flexible elongate member to the body, thereby attaching the article to the clamping arrangement, and in the non-clamping position, the flexible elongate member is movable through the body.

The article may be a cylindrical article. The article may be a pipe. The support may be an elongate support, such as a strut. The connecting device may be a connecting assembly.

The flexible elongate member may be a substantially flat flexible elongate member. The flexible elongate member may be a strap. The flexible elongate member may be formed of a malleable material, such as a suitable metallic material. The flexible elongate member may be coated, for example with a plastics material, to prevent metal on metal contact.

In a first embodiment, the body may be a unitary component. In a second embodiment, the body may comprise an inner main part and an outer cover part. The inner main part may be formed of a metal, such as zinc. The outer cover part may be formed of a plastics material.

The clamping element may comprise a wedge. It will be appreciated that other suitable types of clamping element may be used, for example a roller.

The body may have a clamping surface against which the flexible elongate member can be clamped. The clamping surface may be provided in the inner main part of the body. The clamping element may comprise a clamping face to clamp the flexible elongate member against the clamping surface.

The body may have a holding portion for holding the article. The holding portion may be a substantially V shaped surface. In the second embodiment, the outer cover part may have the holding portion. An upper resilient member may be disposed on the holding portion. The upper resilient member may be deformable to adopt the shape of the holding portion.

The upper resilient member may be resiliently compressible when the flexible elongate member is tightened around the article, thereby preventing over tightening of the flexible elongate member.

The upper resilient member may provide greater friction than the holding portion, thereby reducing longitudinal movement of the article.

The body may define an access formation to allow access of the flexible elongate member to an internal region of the body. In the second embodiment, the inner main part may define the access formation.

The access formation may be an aperture defined by the body. In the second embodiment, the access formation may be defined by the inner main part. The access formation may communicate with the first access region to allow the flexible elongate member to extend from the first access region.

The body and the flexible elongate member may include corresponding attaching formations to attach an end region of the flexible elongate member to the body. One of the corresponding attaching formations may comprise a hole defined by one of the flexible elongate member and the body.

The other of the attaching formations may comprise a projection on the other of the flexible elongate member and the body. The attaching formation on the body may be arranged within said internal region of the body. In the second embodiment, the inner main part of the body may define the hole or may comprise the projection.

The hole may be defined by the flexible elongate member. The projection may be provided on the body. The projection may be a pin.

In an alternative version of the attaching formations, the projection may be provided on the inner main part of the body. The projection may be received in the hole in the end of the flexible elongate member to attach the flexible elongate member to the body.

The attaching formations may comprise deflection formations on the body. In the second embodiment, the deflection formations may be provided on the outer cover part. The deflection members may be provided on the holding portion, and may extend therefrom. Each of the deflection formations may be elongate. Each deflection formation may comprise a deflection rib. The deflection formations may extend through the access formation in the inner main part.

The projection may comprise an inclined surface to guide the end region of the flexible elongate member over the projection as the flexible elongate member is inserted into the body. The deflection formations may be arranged opposite each other across the projection. The deflection formations may be arranged on opposite sides of the projection.

The deflection formations may engage the end region of the flexible elongate member as the flexible elongate member is inserted into the body. Each deflection formation may engage a respective opposite edge region of the flexible elongate member to deflect the edge regions around the projection. The projection may have an apex. Each deflection formation may engage the opposite edge regions of the flexible elongate member to deform the end region around the apex.

The edge regions of the flexible elongate member are so deflected by the deflection formations until the projection is received by the hole in the end region of the flexible elongate member.

The deflection formations may constitute retaining formations to retain the flexible elongate member on the projection. When the projection is received by the hole in the end region of the flexible elongate member, the deflection formations may retain the flexible elongate member on the projection.

The connecting device may comprise a fastening arrangement for fastening the clamping arrangement to the support. The fastening arrangement may include an aperture defined through the body. In the second embodiment, the aperture may be defined through the inner main part of the body.

The fastening arrangement may include a fastener which can be inserted through the aperture in the body, or through the aperture in the inner main part, to fasten the clamping arrangement to the support. The fastener may be a screw or bolt. The fastening arrangement may further include a nut, to which the fastener is attached. The nut may be configured to engage the support to fasten the clamping arrangement to the support.

The connecting device may comprise an urging arrangement for urging the clamping element to the clamping position.

The connecting device may comprise a carriage to carry the clamping element.

The carriage may comprise a holder to hold the clamping element. The holder may be a frame. The clamping element may be captive in the holder.

The carriage may include the urging arrangement. The carriage may include a reaction member to apply a reaction force on the urging arrangement to enable the urging arrangement to urge the clamping element to the clamping position.

The urging arrangement may comprise a spring member. The urging arrangement may comprise one or more spring members. The, or each, spring member may be a zig zag spring.

One version of the carriage may comprise an urging arrangement comprising two of the spring members. It will be appreciated that the urging arrangement may comprise any suitable number of spring members.

The spring members may be arranged opposite one another, the clamping element being disposed between the spring members.

Another version of the carriage may comprise an urging arrangement comprising a single spring member, which may be arranged substantially centrally on the reaction member.

The urging arrangement may extend from the reaction member to the clamping element. The urging arrangement may extend from the reaction member to the holder. The spring member may extend from the reaction member to the clamping element. The spring member may extend from the reaction member to the holder.

The body may define an internal space to receive the carriage. In the second embodiment, the internal space may be defined by the inner main part of the body. The clamping surface may be a surface defining the internal space.

The carriage may be substantially flat. The carriage may be insertable into the body, or into the inner main part.

The carriage may be slidable into the internal space in the body, or in the inner main part. The connecting device may include a securing arrangement to secure the carriage to the body, or to the inner main part.

The securing arrangement may comprise a detent formation. The detent formation may comprise a hook formation. The detent formation may be provided on one of the carriage and the body.

The securing arrangement may comprise a cooperating formation cooperable with the detent formation. The cooperating formation may be a recess to receive the detent formation. The cooperating formation may be provided on the other of the carriage and the body.

In one version of the securing arrangement, the securing arrangement may comprise a first securing formation on the carriage. The securing arrangement may comprise a second securing formation on the body.

The first securing formation may comprise the detent formation. The second securing formation may comprise the cooperating formation to cooperate with the detent formation. The second securing formation may be a recess defined by the body.

One of the carriage and the body may comprise two of the detent formations on opposite sides of the carriage or the body. The other of the carriage and the body may comprise two of the cooperating formations on opposite sides of the body or the carriage. The carriage may comprise the two detent formations on opposite sides of the carriage. The body may comprise the two cooperating formations on opposite sides of the body. Each cooperating formation may comprise one of the recesses.

The body may define a first opening arrangement through which the carriage can be inserted into the body. The body may define a second opening arrangement through which the carriage extends when the carriage is received in the body.

The carriage may be inserted through the first opening arrangement into the internal space. In the second embodiment, the inner main part may define the first opening arrangement. The first opening arrangement may have a first carriage receiving region to receive a portion of the carriage therethrough. The second securing formation may be provided adjacent the carriage receiving region.

The carriage may extend through second opening arrangement when the carriage is received in the internal space. In the second embodiment, the inner main part may define the second opening arrangement. The second opening arrangement may have a second carriage receiving region to receive a portion of the carriage therethrough.

The first and second opening arrangements may provide communication between a region external of the body and the internal space. The first opening arrangement may be defined at one end of the body. The second opening arrangement may be defined at the opposite end of the body.

The inner main part may have opposite first and second sides, and front and rear faces. The inner main part may define the internal space. The inner main part may define the opposite first and second opening arrangements. The inner main part may define the first and second carriage receiving regions and the first and second access regions.

The outer cover part may further include downwardly extending side wall portions, and front and rear wall portions. The side wall portions may extend over the first and second sides of the inner main part. The front and rear wall portions may extend over the front and rear faces.

The front wall portion may constitute the second securing formation in another version of the securing arrangement. The front wall portion may extend across said first carriage receiving region. The front wall portion may extend across said reaction member, thereby securing the carriage in the body. Thus, the front wall portion may provide an abutment to allow the reaction member to apply the reaction force to the urging arrangement.

The carriage may include a release portion for moving the clamping element from the clamping position to the non-clamping position. The release portion may extend through the second opening arrangement when the carriage is received in the internal space. The second opening arrangement may be opposite the first opening arrangement.

The clamping element may be provided on the release portion. The release portion may be movable relative to the first securing formation.

The first opening arrangement may have a first access region to provide access for the flexible elongate member to the internal space. The first opening arrangement may be defined at a first end of the body.

In the second embodiment, the inner main part may define the first access region. The first access region may be open to communicate with the first carriage receiving region. Alternatively, the first access region and the first carriage receiving region may be separate from each other.

The second opening arrangement may have a second access region to provide access for the flexible elongate member to the internal space. The second opening arrangement may be defined at the opposite second end of the body.

In the second embodiment, the inner main part may define the second access region. The second access region may be open to communicate with the second carriage receiving region. Alternatively, the second access region and the second carriage receiving region may be separate from each other.

The front wall portion may define a front opening, which may align with the first access region of the first opening arrangement.

The rear wall portion may define a rear recess, which may align with the second carriage receiving region. The rear wall portion may define a rear opening, which may align with the second access region of the second opening arrangement.

The carriage may have first and second opposite ends. The first securing formation may be provided at the first end of the carriage. The release portion may extend to the opposite second end of the carriage.

The second end of the carriage may project from the second opening arrangement. The second end of the carriage may project from the second carriage receiving region of the second opening arrangement. Thus, a user can press the second end of the carriage into the body, or into the inner main part, to move the clamping element to the non-clamping position. The user may press the second end of the carriage to move the release portion inwardly of the body, or of the inner main part, to release the clamping element.

The carriage may include a ramp formation to direct the flexible elongate member through the body. The ramp formation may direct the flexible elongate member through the first access region. The ramp formation may extend between the clamping element and the first end of the carriage. The ramp formation may extend between the clamping element and reaction member.

The ramp formation may comprise two adjacent ramps. The ramps may be provided on opposite sides of the clamping element.

In the embodiment described herein the ramps provide the advantage that they assist in arranging the elongate member as flat as possible. The elongate member may be naturally curved/coiled. As a result, it may cause the clamping element problems in gripping the strap. The flattening of the elongate member by the ramps facilitates the clamping element gripping the elongate member.

The ramp formation may comprise a ramped surface. Each of the ramps may comprise a respective ramped surface. When the clamping element is in the clamping position, the, or each, ramped surface of the ramp formation may be disposed further from the clamping surface of the body, or the inner main part, than the clamping face of the clamping element.

When the clamping element is in the non-clamping position, the clamping face of the clamping element may be disposed further from the clamping surface of the body, or the inner main part, than the, or each, ramped surface of the ramp formation. This allows the clamping face to be fully disengaged from the flexible elongate member when the clamping element is in the non-clamping position.

The carriage may define an aperture arranged to align with the aperture in the body, or with the aperture in the inner main part, whereby the fastener can be inserted through the aperture in the carriage. The aperture in the carriage may be defined through the release portion.

The connecting device may further include a tightening element for tightening the flexible elongate member against the article. The tightening element may be movable to engage the flexible elongate member and urge the flexible elongate member into tight engagement with the article.

The tightening element may be held by the body, or by the inner main part. The tightening element may be rotatable to a tightened position in which the tightening element is tightened against the flexible elongate member. In the tightened position, the flexible elongate member is pulled tightly against the article by the tightening element. The tightening element may be rotatable to a non-tightened position in which the tightening element is not tightened against the flexible elongate member. In the non-tightened position, the flexible elongate member is not tightened against the article by the tightening element.

The tightening element may have a main axis about which the tightening element rotates. The tightening element may comprise a shaft aligned with the main axis.

The shaft may comprise a proximal portion and a distal portion. The tightening element may further include a cam member for engaging the flexible elongate member. Said cam member may be offset from the main axis. The cam member may be a central portion. The cam member may be arranged between the proximal and distal portions.

The body, or the inner main part, may include an engaging portion for engaging the cam member.

The engaging portion may have a cam engaging surface for engaging the cam member. The engaging portion may include a stop member, which may extend from the cam engaging surface. The stop member may engage the cam member when the cam member is in the non-tightened position.

The cam member may comprise a nose portion. The cam engaging surface and the stop member may define a cam receiving recess therebetween for receiving the nose portion. The cam receiving recess may receive the nose portion when the tightening element is in the non-tightened position.

The cam member may define a stop recess. The stop recess may be opposite the nose portion. The stop recess may receive the stop member when the tightening element is in the tightened position, thereby stopping the tightening element from being rotated beyond the tightened position.

The cam member and the body may comprise locking formations for locking the tightening element in the non-tightened position. The locking formations may comprise an indentation on one of the tightening element and the body, and a protrusion on the other of the tightening element and the body. In the second embodiment, the locking formation on the body may be on the inner main part.

The indentation may be on the tightening element. The indentation may be defined by the cam member. The indentation may be defined at an end of the stop recess defined by the cam member.

The locking formations may comprise two of the indentations. The indentations may be on opposite sides of the tightening element. The indentations may be defined opposite each other across the stop recess. The indentations may be defined at opposite ends of the stop recess.

The protrusion may be on the body. The locking formations may comprise two of the protrusions. The protrusions may be arranged on opposite sides of the body. In the second embodiment, the, or each, protrusion may be on the inner main part. Each protrusion may be arranged on a respective one of the first and second sides of the inner main part.

The connecting device may comprise cooperating affixing formations to affix the outer cover part to the inner main part. The cooperating affixing formations may comprise a plurality of fins on one of the outer cover part and the inner main part.

The cooperating affixing member may further include a plurality of concavities defined by the other of the outer cover part and the inner main part. The plurality of fins may be provided on the inner main part. The plurality of concavities may be defined by the outer cover part.

The plurality of concavities may be defined by the first and second side wall portions of the outer cover part. The plurality of concavities may be defined at the lower edges of the aforesaid first and second side wall portions.

The plurality of concavities may receive the plurality of fins to affix the outer cover part to the inner main part. The cooperating affixing formations may frictionally engage each other to affix the outer cover part to the inner main part. In use, the weight of the article, and/or the force applied thereto by the flexible elongate member may ensure that the outer cover part to the inner main part are securely affixed to each other.

The plurality of fins may be provided on the first and second sides of the inner main part. The plurality of fins may be provided on lower regions of the first and second sides of the inner main part.

At least one embodiment of the invention will now be described by way of example only, with reference to the accompanying drawings, in which:

FIG. 24(iii) is a plan view from one side of the further tightening element;

Figure 27I:
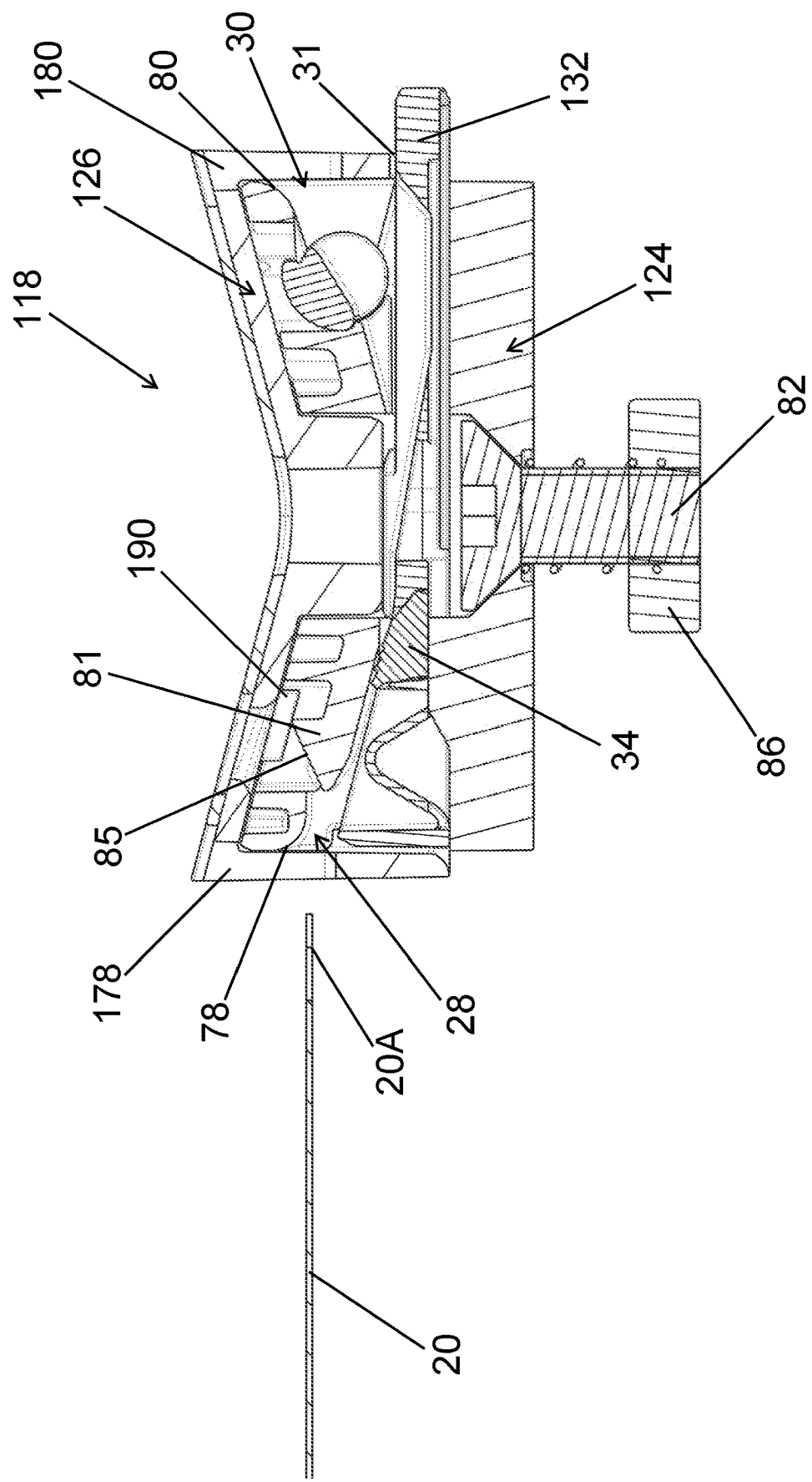
Figure 27:
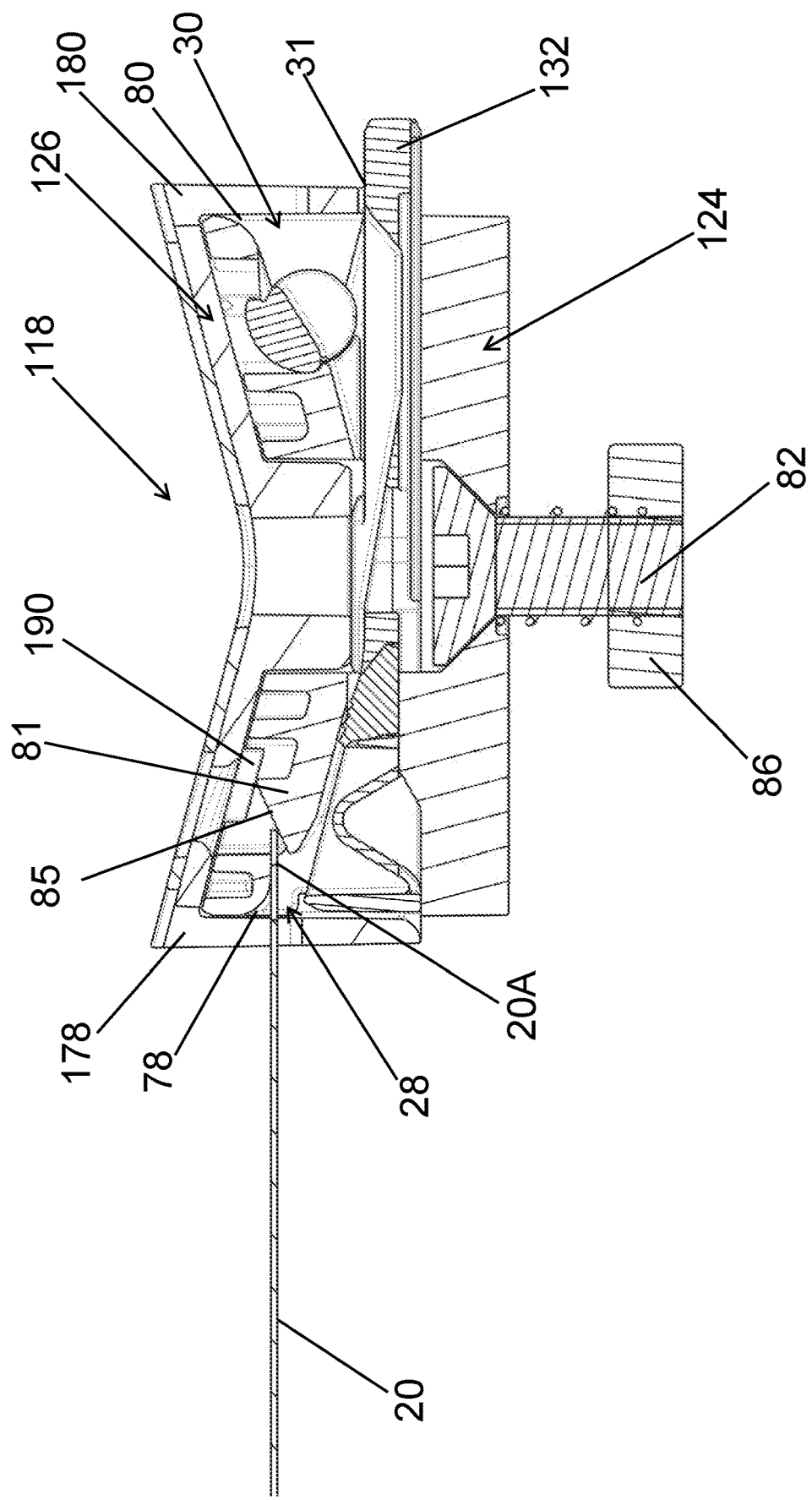
Figure 27:
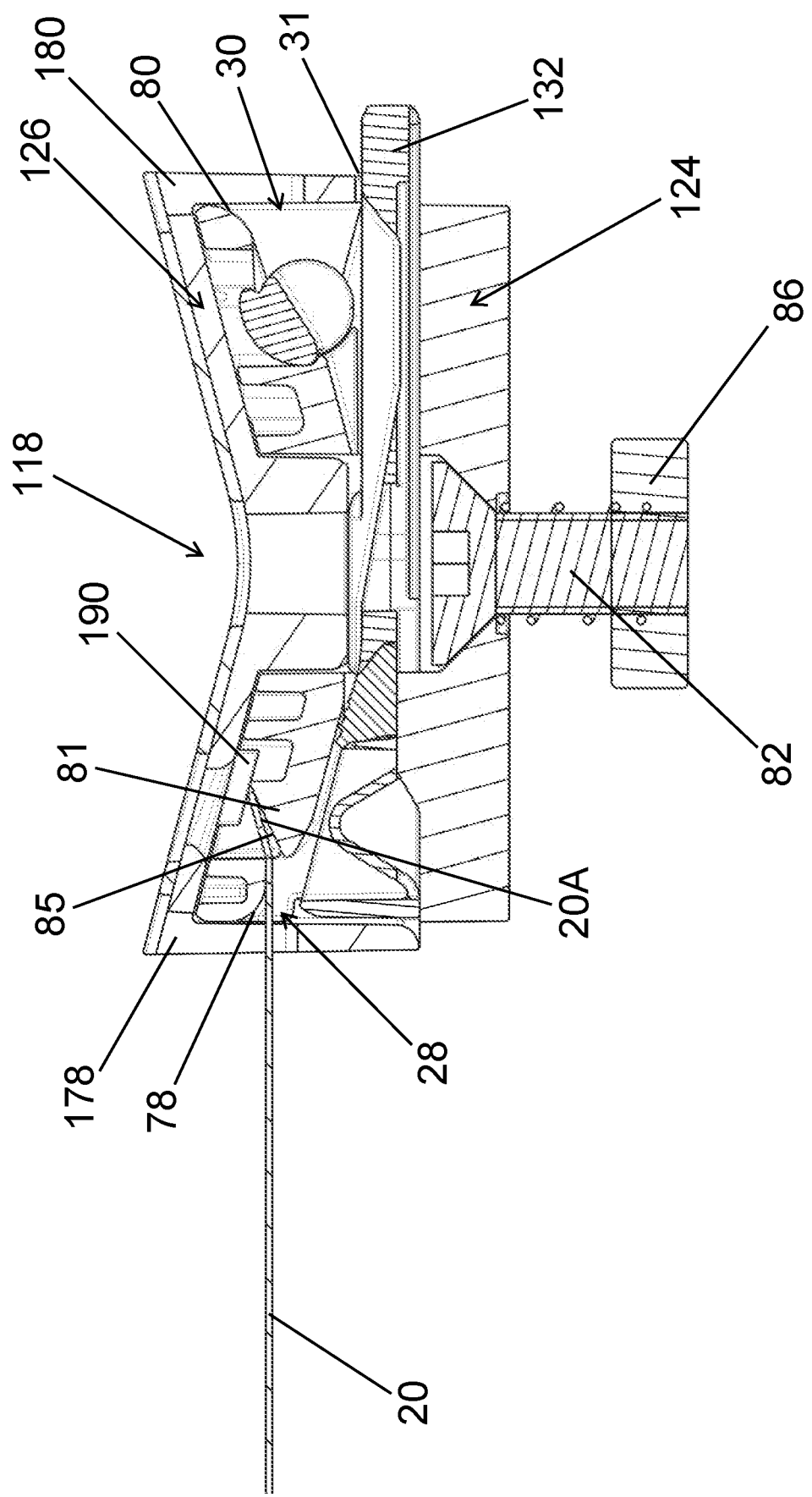

FIGS. 27(i) to 27(vi) show the sequence for installing a flexible elongate member in the clamping arrangement.

Figure 22:
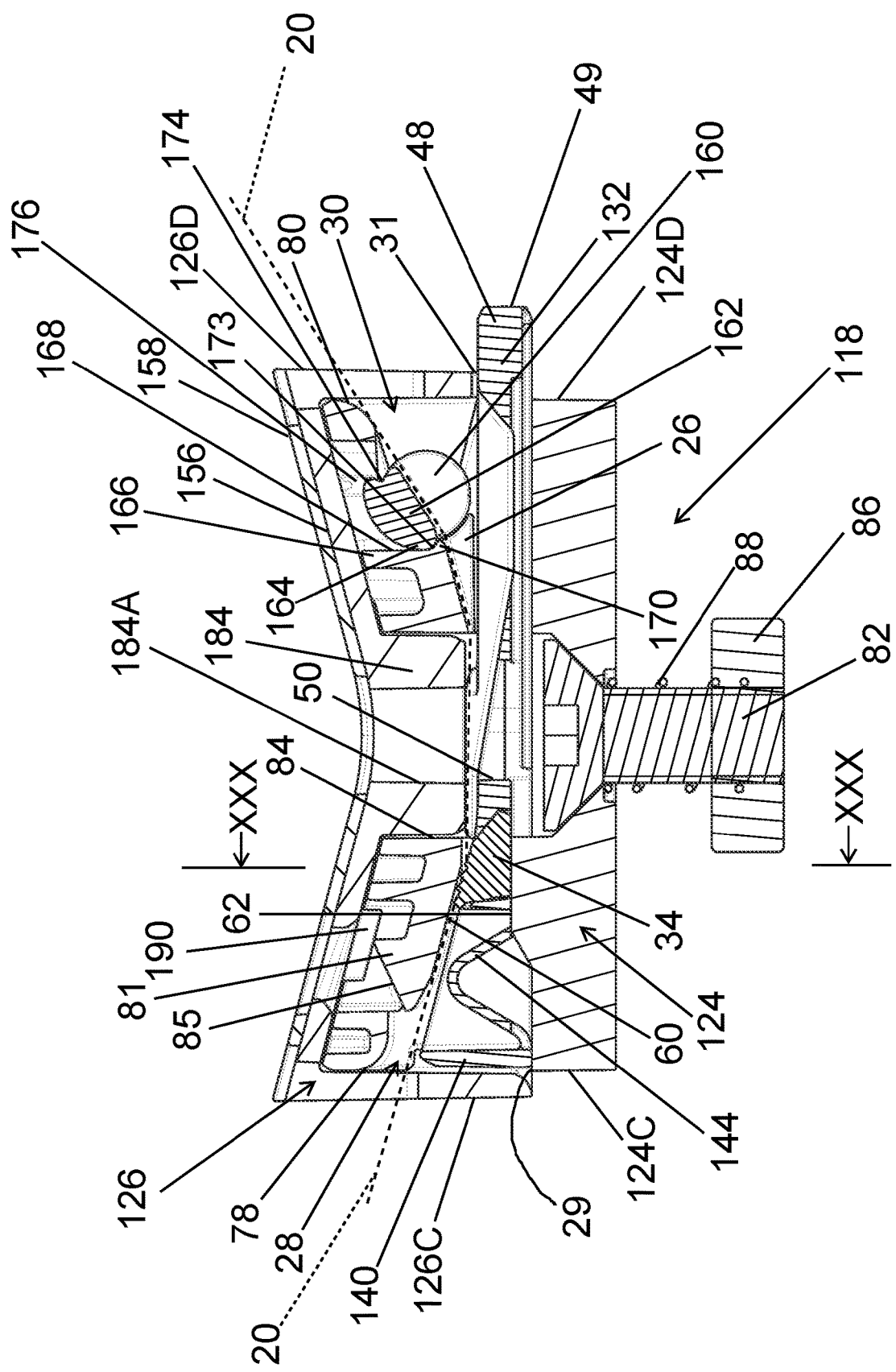
FIG. 22 is a sectional view of the clamping arrangement, showing the clamping element in a clamping position, and a tightening element in a non-tightened position.
Figure 23:
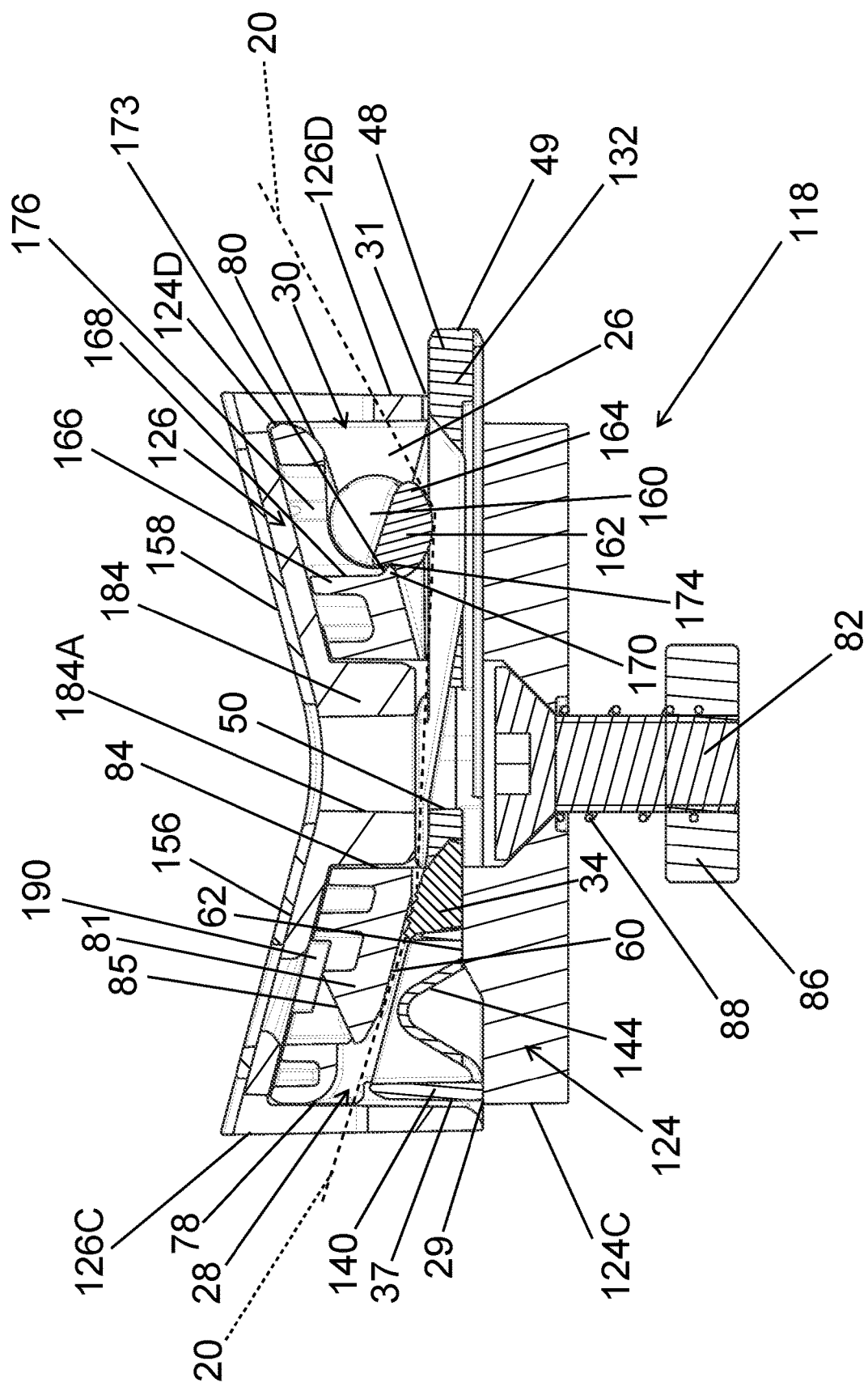
FIG. 23 is a sectional side view of the clamping arrangement, showing the clamping element in a clamping position, and the tightening element in a tightened position.
Figure 27V:
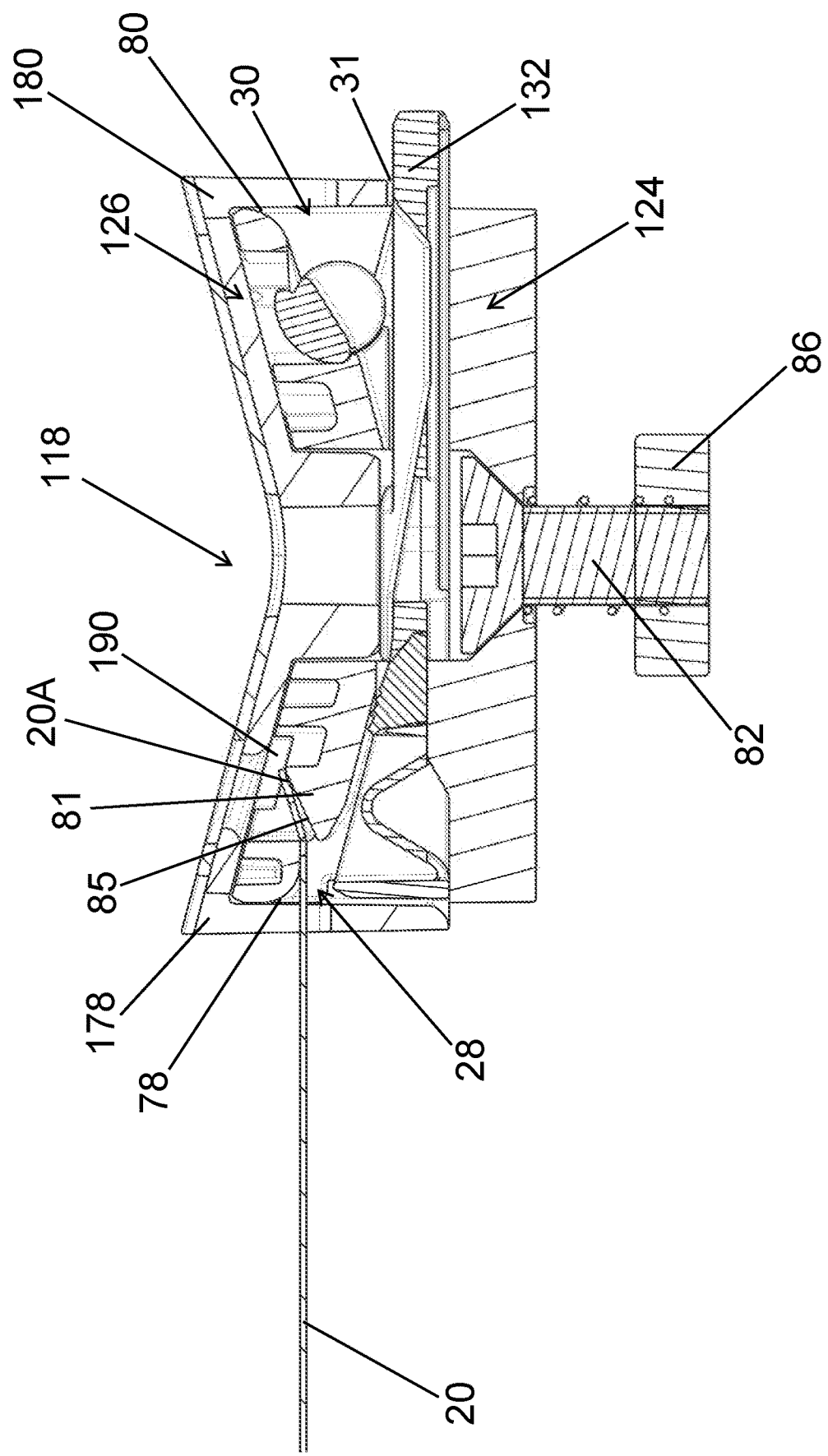
Figure 27:
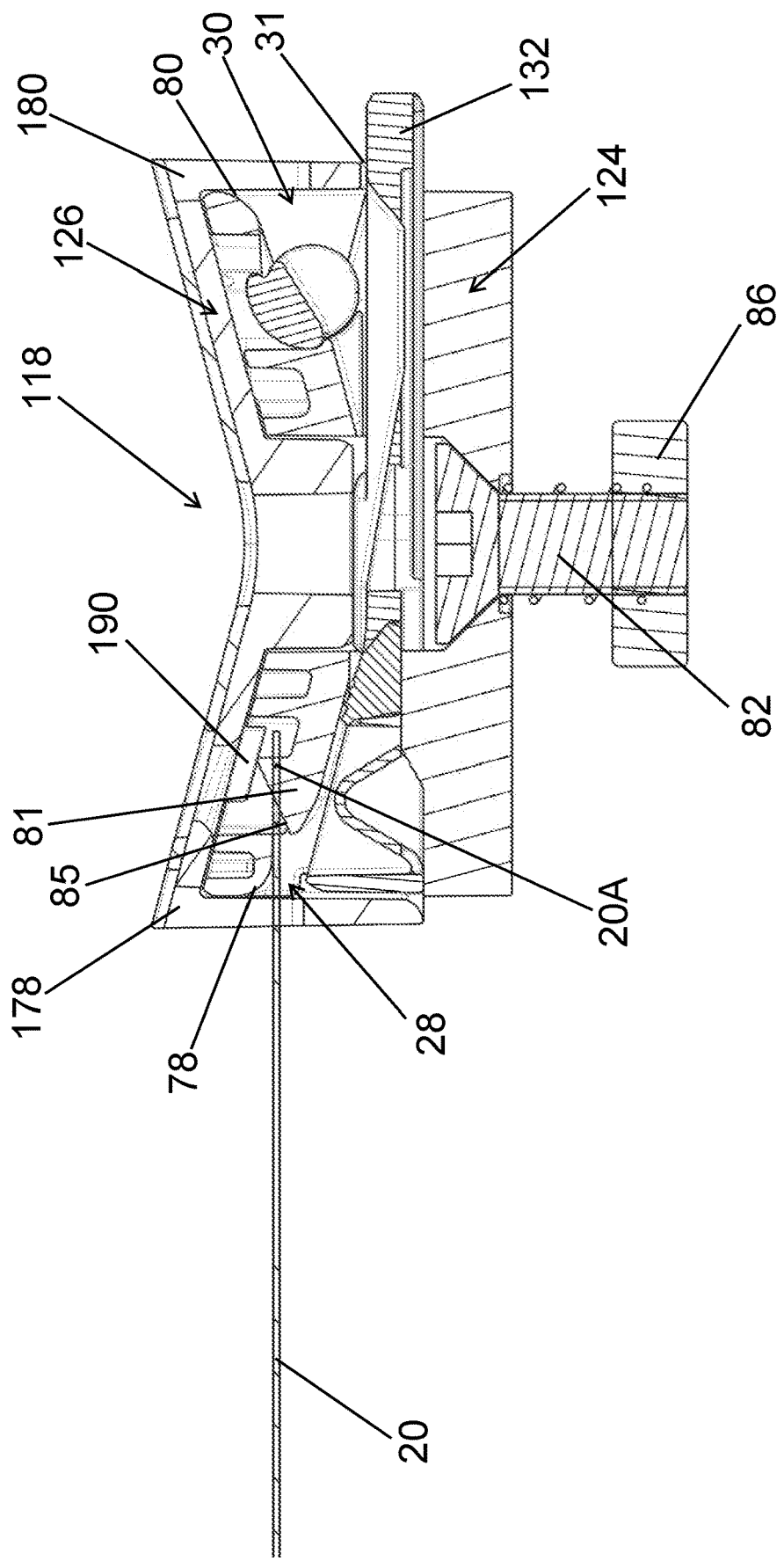
Figure 28:
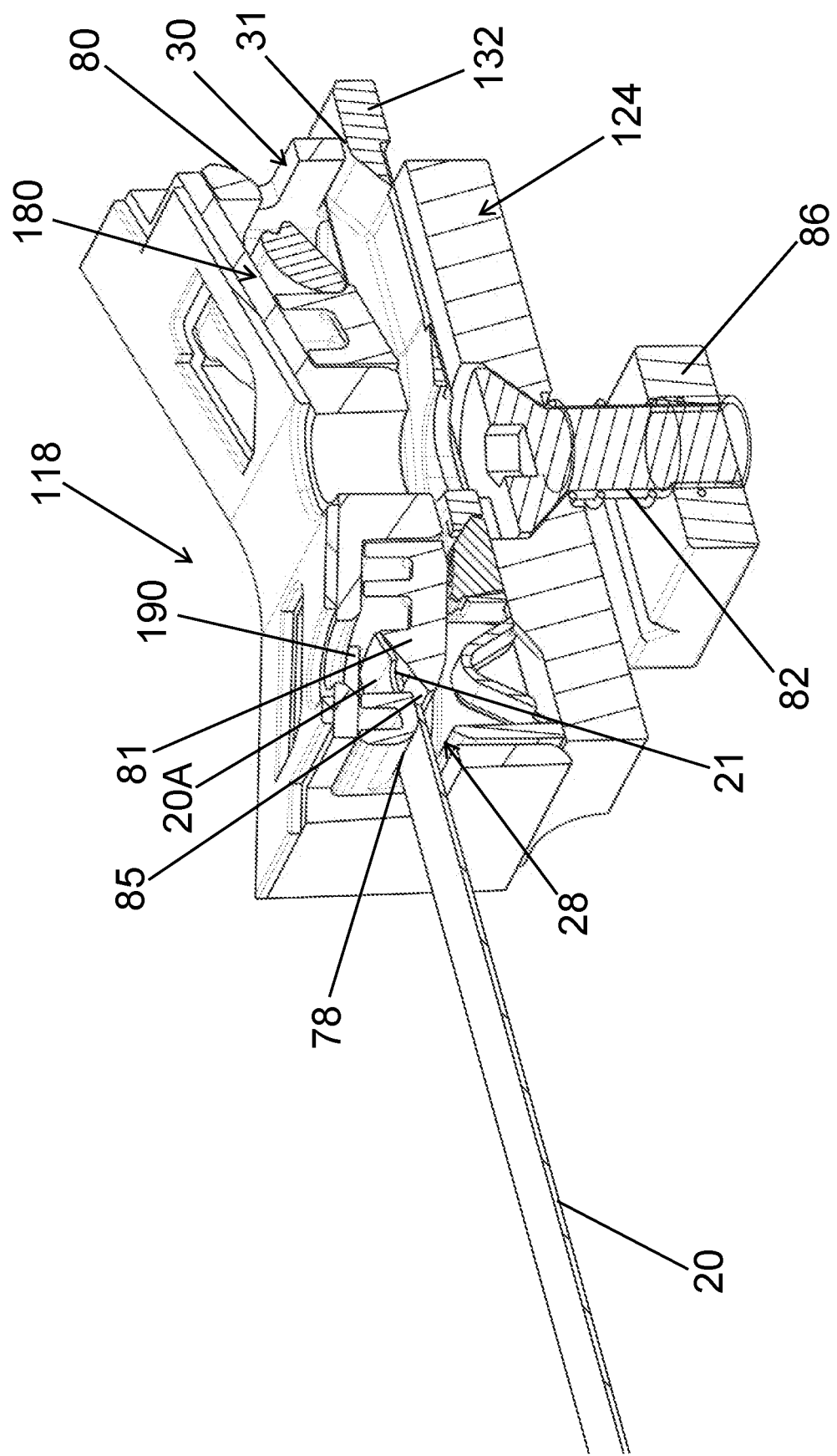
Figure 29:
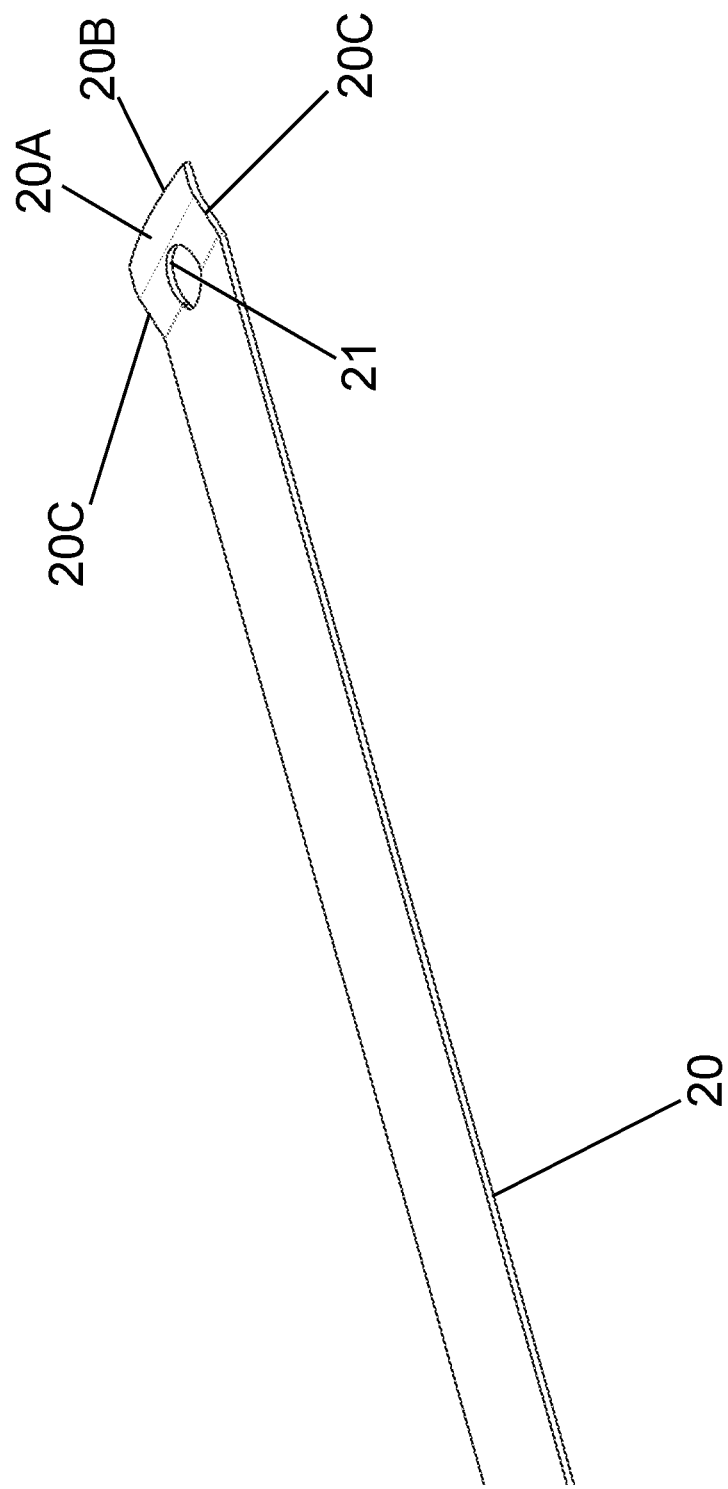
Figure 30:
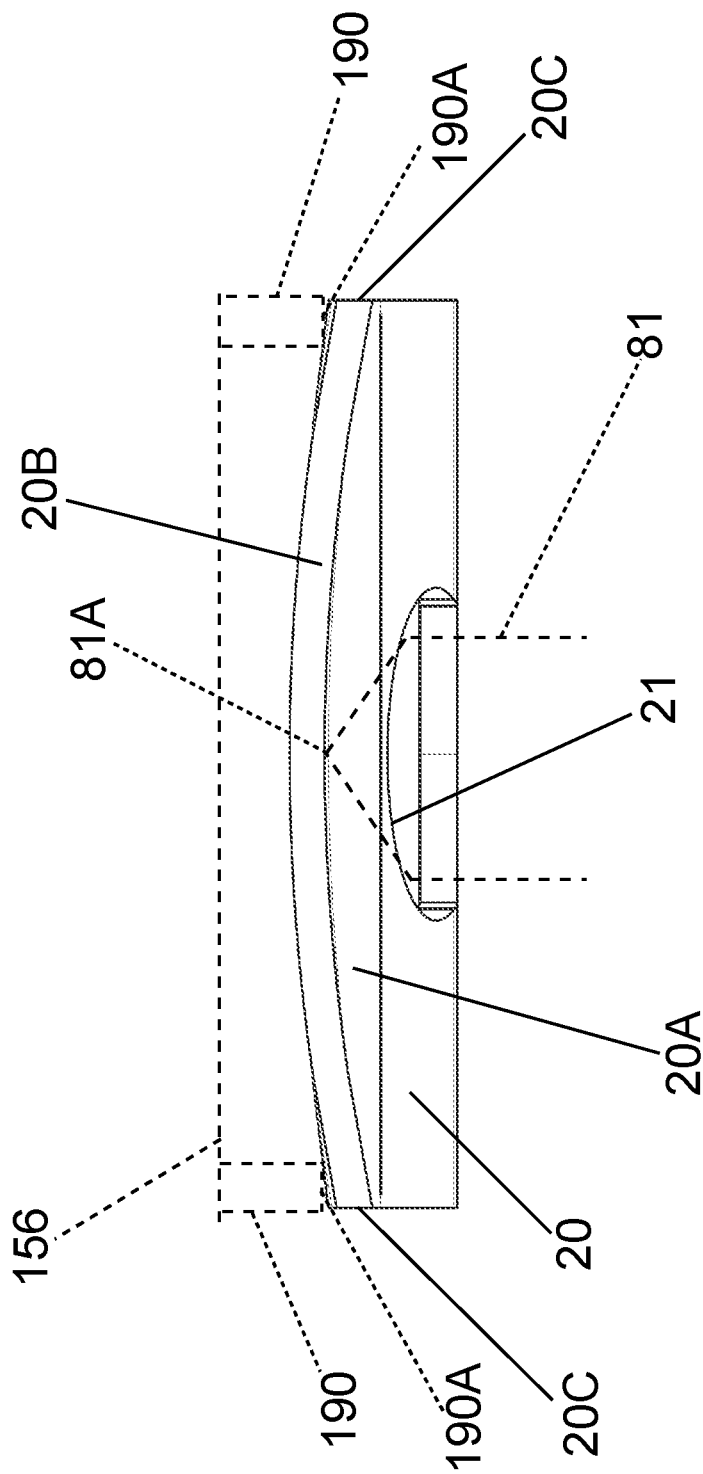
Figure 31:
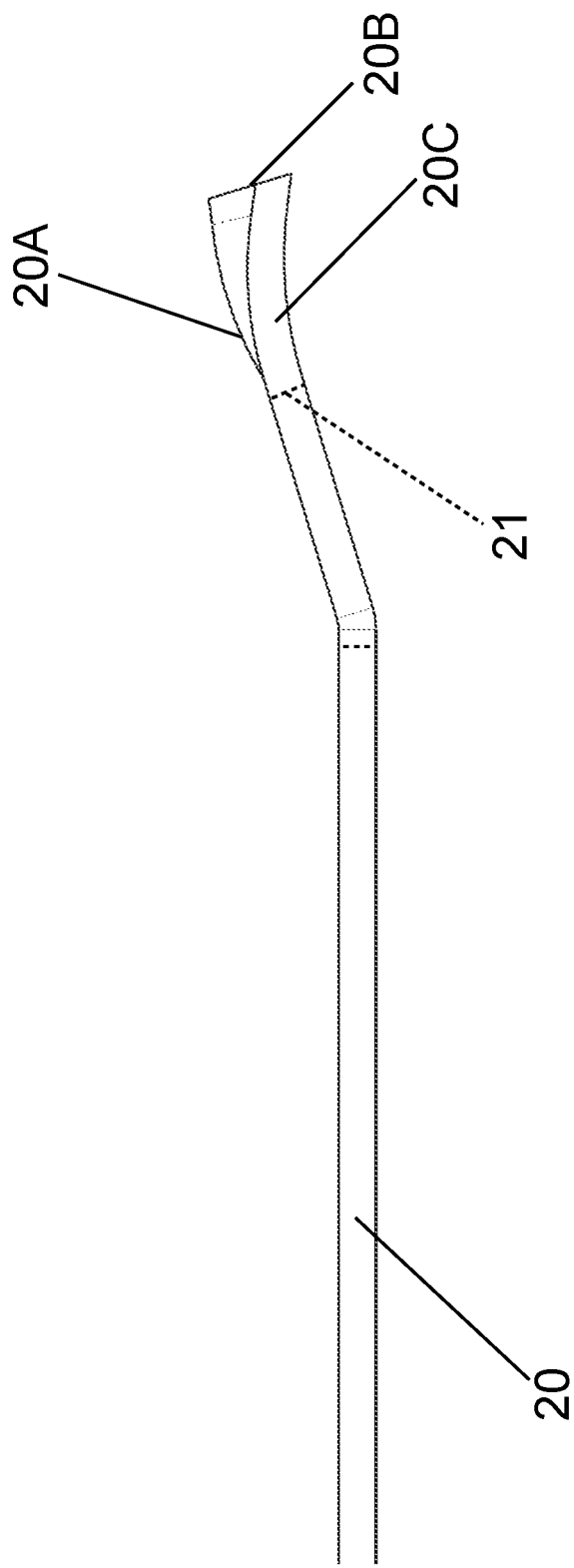
Figure 32:
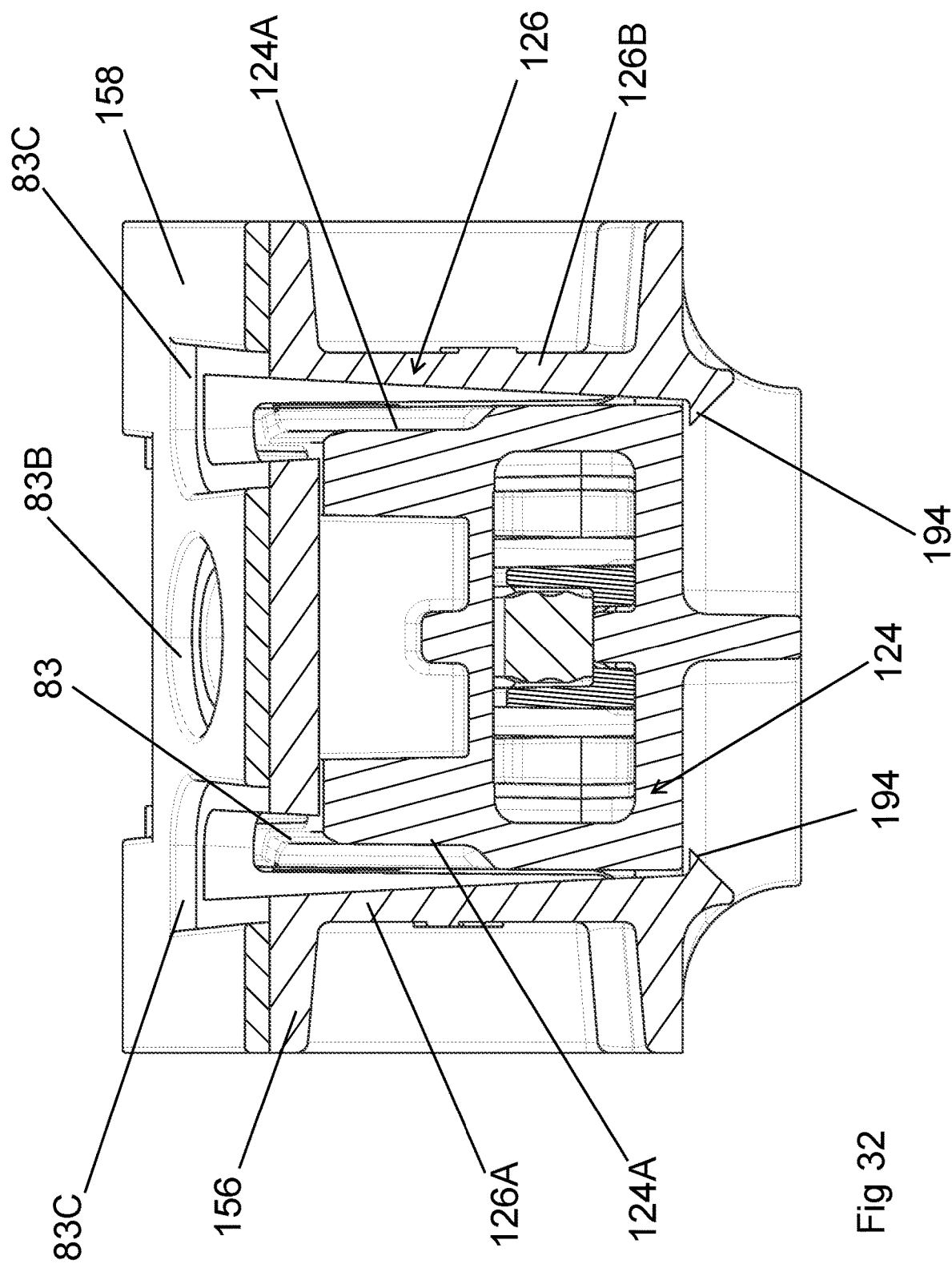

FIG. 28 is a sectional side perspective view from one direction of the further clamping arrangement showing the flexible elongate member in the same position as in FIG. 27(v);

FIG. 29 is a side perspective view of the elongate member in its condition as shown in FIG. 27(v);

FIG. 30 is an end view of the elongate member in its condition as shown in FIG. 27(v);

FIG. 31 is a side view of an end region of the flexible elongate member in its condition as shown in FIG. 27(v); and FIG. 32 is a view along the lines XXX-XXX in FIG. 22.

FIGS. 1 to 14 of the drawings show a connecting device 10 for connecting an article 12, in the form of a pipe, to a support 14, in the form of a strut. The support 14 has return formations 16 extending inwardly thereof.

The connecting device 10 comprises a clamping arrangement 18 and a flexible elongate member 20. In the drawings, the flexible elongate member 20 is in the form of a strap formed of a metallic material.

Figure 1:
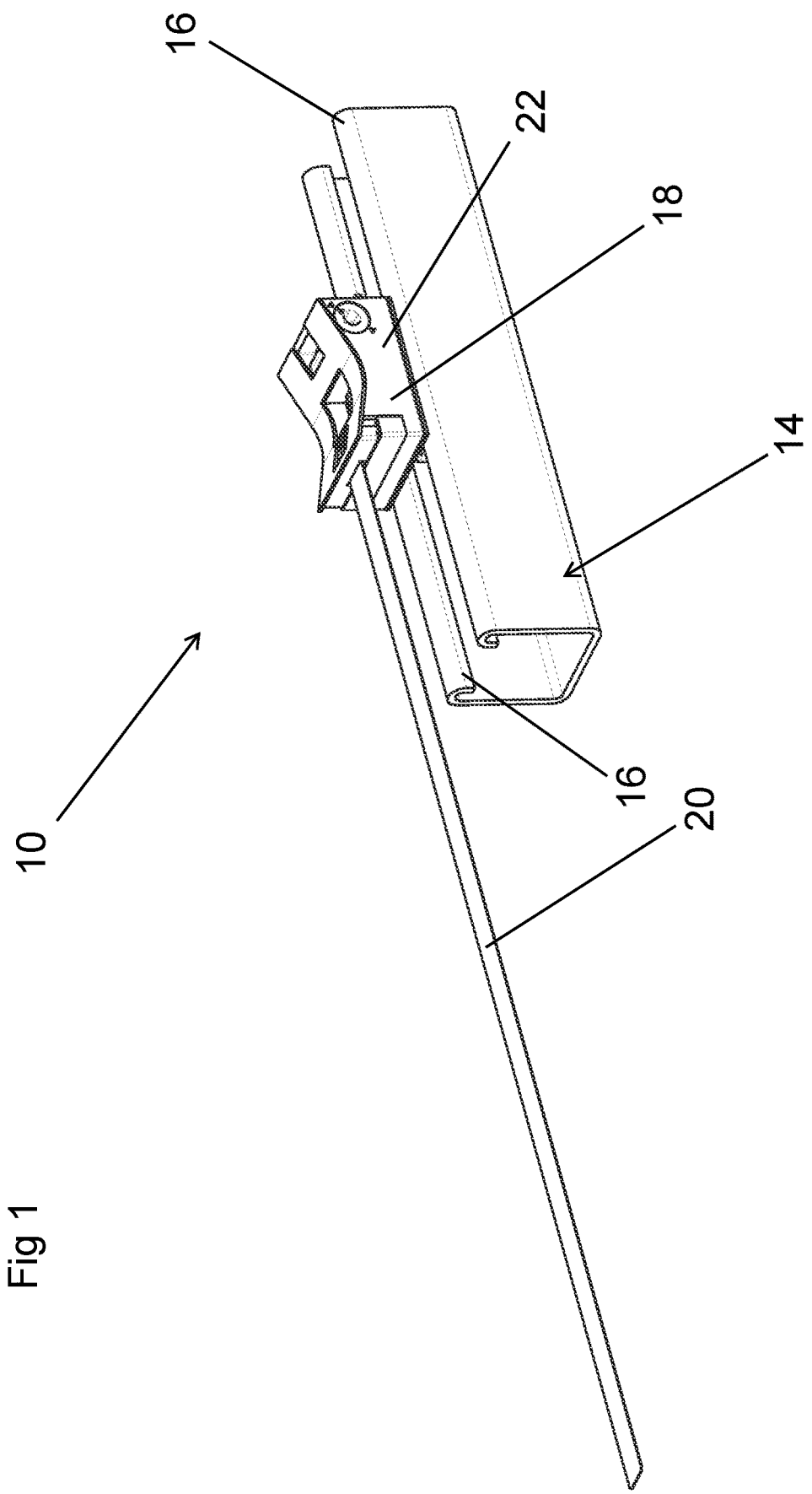
FIG. 1 is a perspective view of a connecting device mounted on a support.
Figure 2:
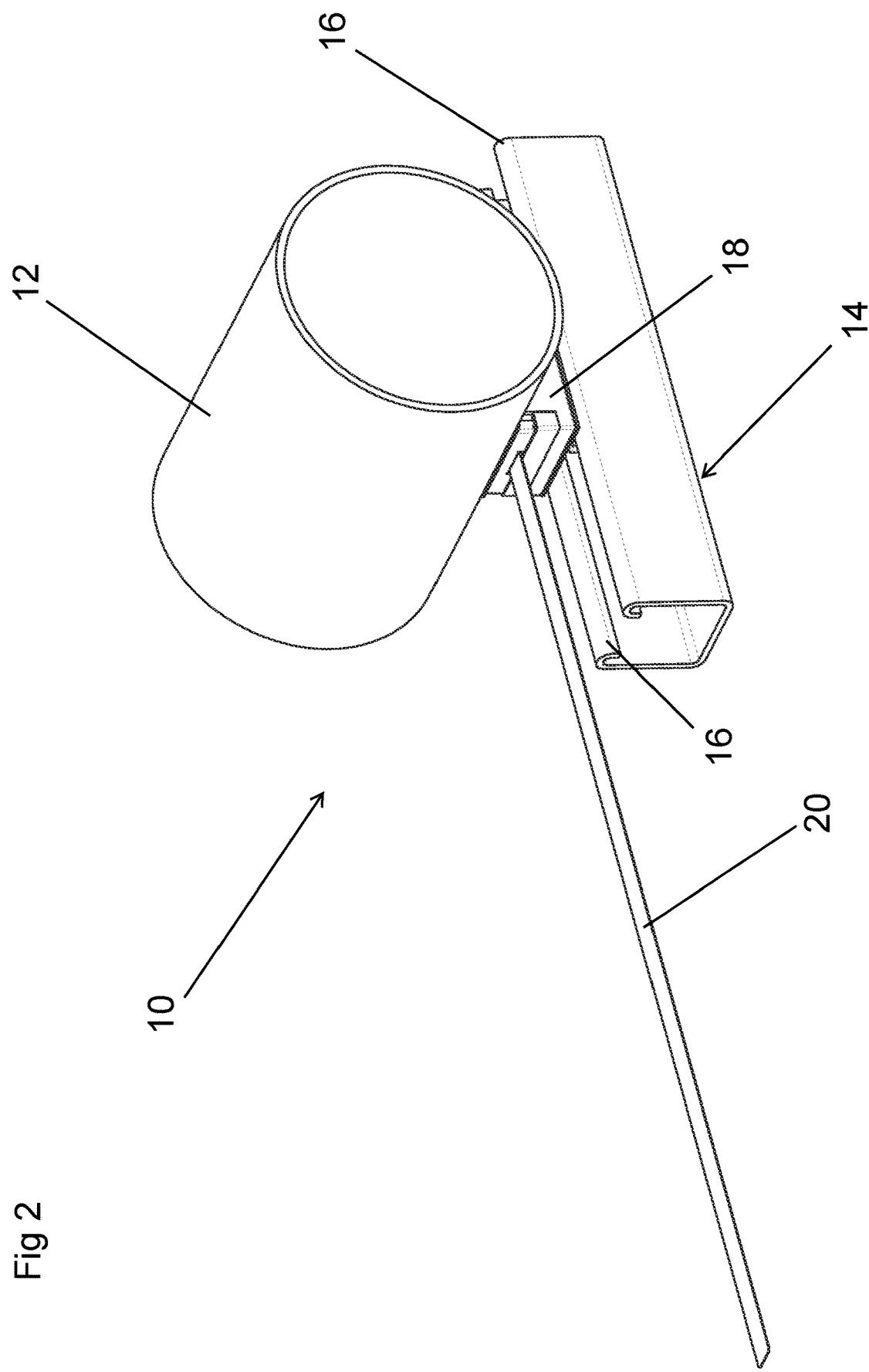
FIG. 2 shows the connecting device of FIG. 1, with an article thereon.
Figure 3:
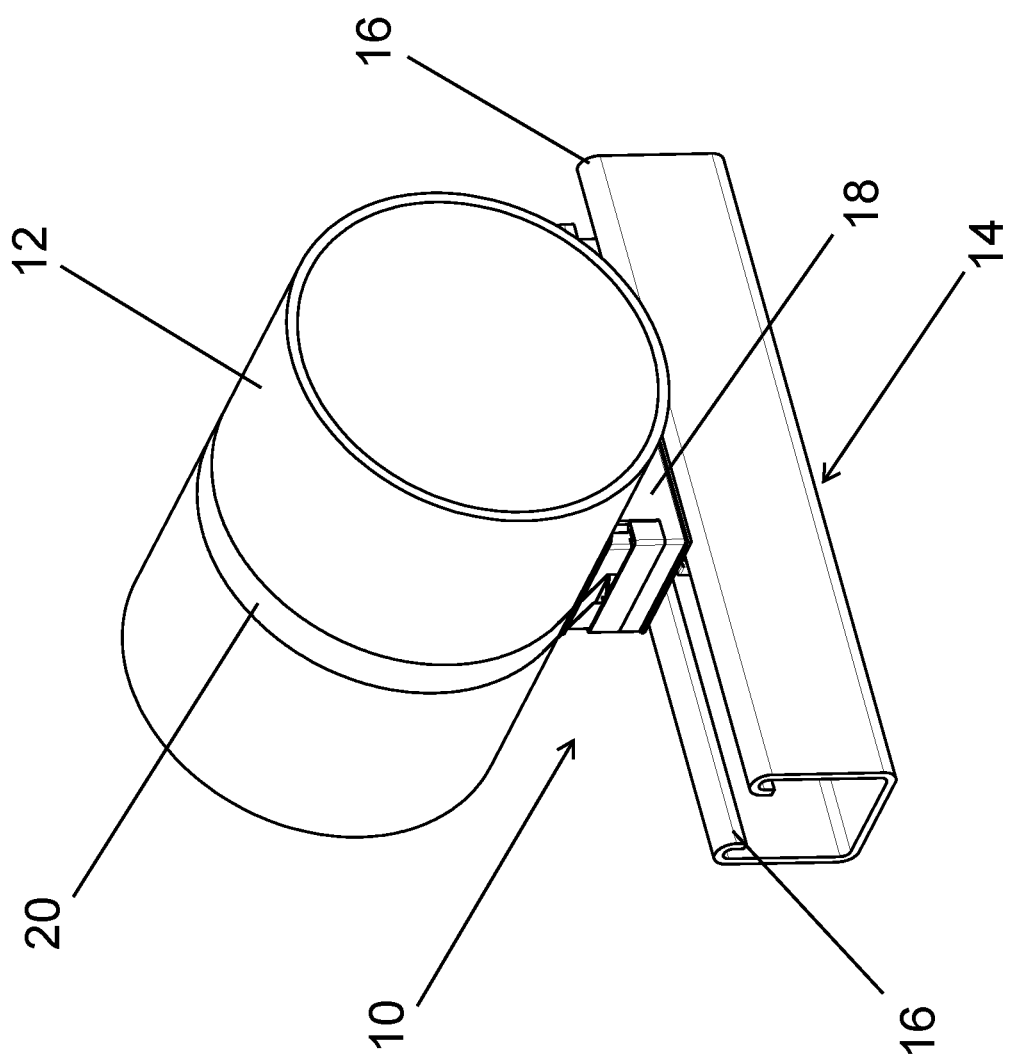
FIG. 3 shows the connecting device of FIGS. 1 and 2, in which the connecting device is attached to the article.
Figure 4:
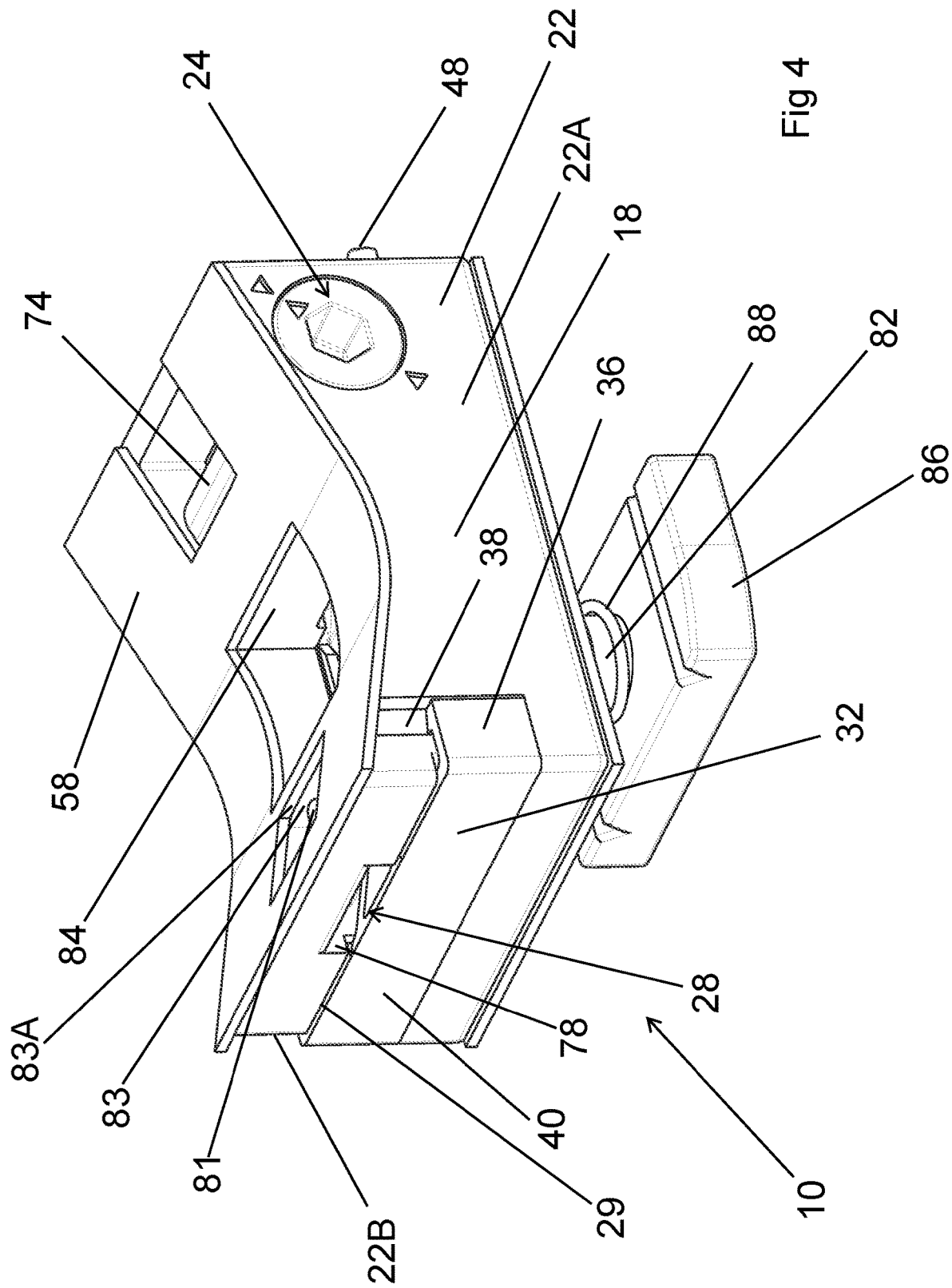
FIG. 4 is a perspective view from one side of a clamping arrangement, being part of the connecting device.

Referring to FIGS. 1 to 3, the clamping arrangement 18 is disposed on the support 14, and fastened thereto in a manner described below.

Also as described in more detail below, the article 12 is then disposed on the clamping arrangement 18, and attached thereto by means of the flexible elongate member 20. The flexible elongate member 20 extends from one end of the clamping arrangement 18, and is wrapped around the article 12. The flexible elongate member 20 is inserted back into the opposite end of the clamping arrangement 18 to be clamped therein. A tightening element 24 (see FIG. 3) can then be moved to a tightened position to tighten the flexible elongate member 20 against the article 12

Referring to FIGS. 4 to 7, the clamping arrangement 18 comprises a body 22 having opposite first and second sides 22A, 22B. The body 22 defines an internal space 26 extending therethrough. The body 22 defines opposite first and second opening arrangements 28, 30 to provide communication between the region external of the body 22 and the internal space 26. The first opening arrangement 28 is defined at a first end of the body 22. The second opening arrangement 30 is defined at the opposite second end of the body 22.

The connecting device 10 further includes a carriage 32 (see FIGS. 6 and 7) receivable in the internal space 26. The first and second opening arrangements 28, 30 have respective first and second carriage receiving regions 29, 31.

Figure 13:
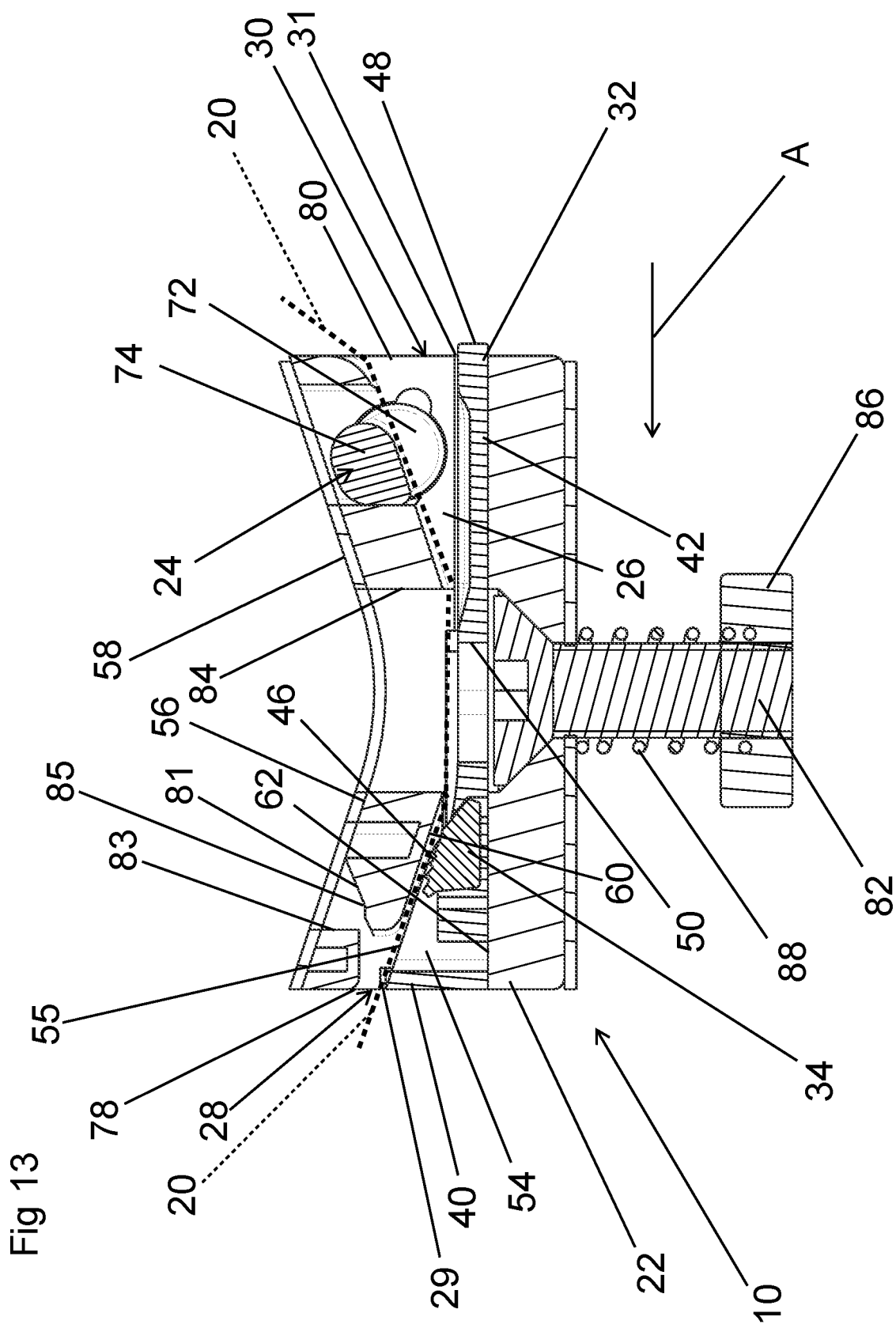
FIG. 13 is a sectional side view showing a clamping element in a non-clamping position.
Figure 14:
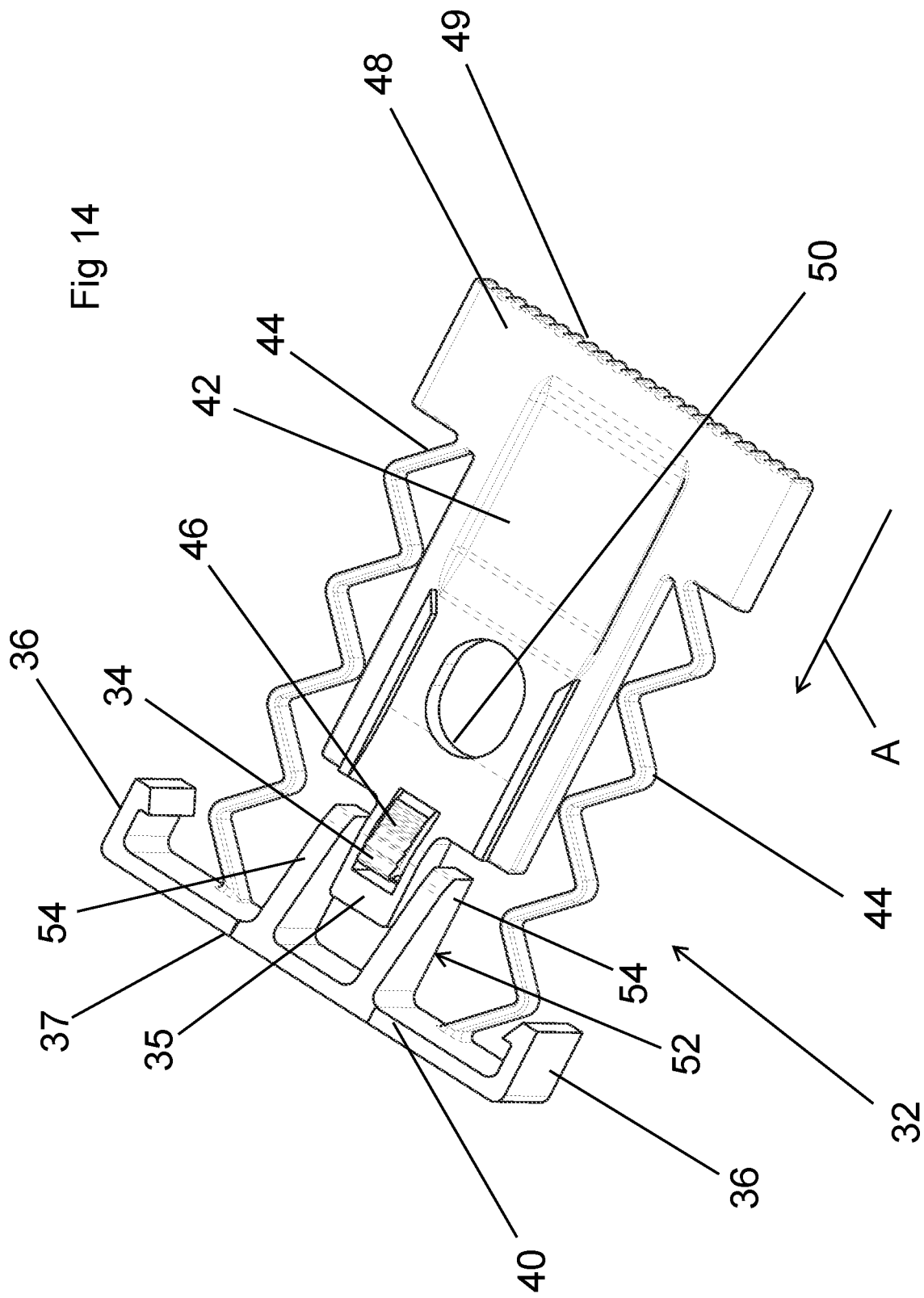
FIG. 14 is a perspective view of a carriage incorporating the clamping element.

The carriage 32 is shown specifically in FIG. 14, and carries a clamping element 34 in the form of a wedge captive within a frame 35. The clamping element 34 is movable between a clamping position (shown in FIGS. 8 and 10), and a non-clamping position (shown in FIG. 13). The clamping position and the non-clamping position of the clamping element 34 are described in more detail below.

The connecting device 10 includes a securing arrangement for securing the carriage 32 to the body 22. The securing arrangement comprises two detent formations 36 on the carriage 32 and two cooperating formations 38 on the body 22 (see FIG. 4), the cooperating formations 38 being configured to cooperate with the detent formations 36 to secure the carriage 32 to the body 22.

The carriage 32 further includes a reaction member 40 extending between the detent formations 36 at a first end 37 of the carriage 32.

The detent formations 36 are in the form of outwardly extending hook formations arranged on opposite sides of the carriage 32. The cooperating formations 38 are in the form of recesses defined externally in the body 22. The recesses are defined on opposite sides of the body 22 adjacent the first carriage receiving region 29.

The carriage 32 further includes a substantially planar release portion 42 attached to the reaction member 40 by an urging arrangement in the form of two zig zag springs 44.

When the carriage 32 is secured to the body 22 by means of the detent formations 36, the reaction member 40 can apply a reaction force to the springs 44, so that the springs 44 urge the release portion 42 away from the reaction member 40. As explained below, this movement of the release portion away from the reaction member 40 urges the clamping element 34 to its clamping position.

The clamping element 34 is provided on the release portion 42. The clamping element 34 has a clamping face 46 that is sloped relative to the release portion 42. The clamping face 46 is provided with teeth to enhance the grip of the clamping element 34 on the flexible elongate member 20. The springs 44 are provided on opposite sides of the clamping element 34, and extend between the release portion 42 and the reaction member 40. The zig zags of the springs 44 are oriented in the plane of the release portion 42.

The release portion 42 extends to a second end 48 of the carriage 32, and includes an edge region 49 at said second end 48. The edge region 49 projects from the body 22 through the second carriage receiving region 31 of the second opening arrangement 30.

Figure 8:
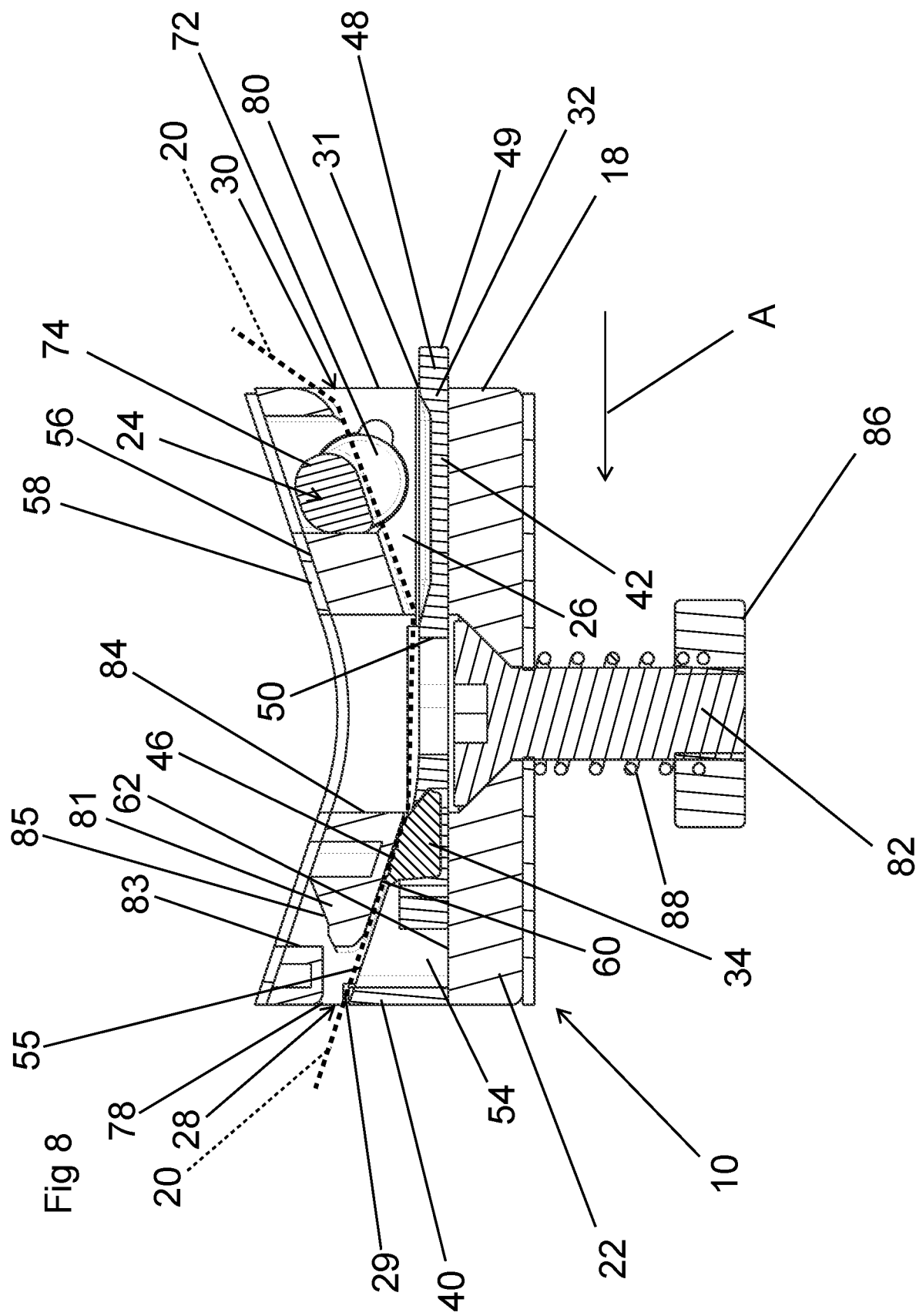
FIG. 8 is a sectional view of the clamping arrangement, showing a clamping element in a clamping position, and a tightening element in a non-tightened position.
Figure 10:
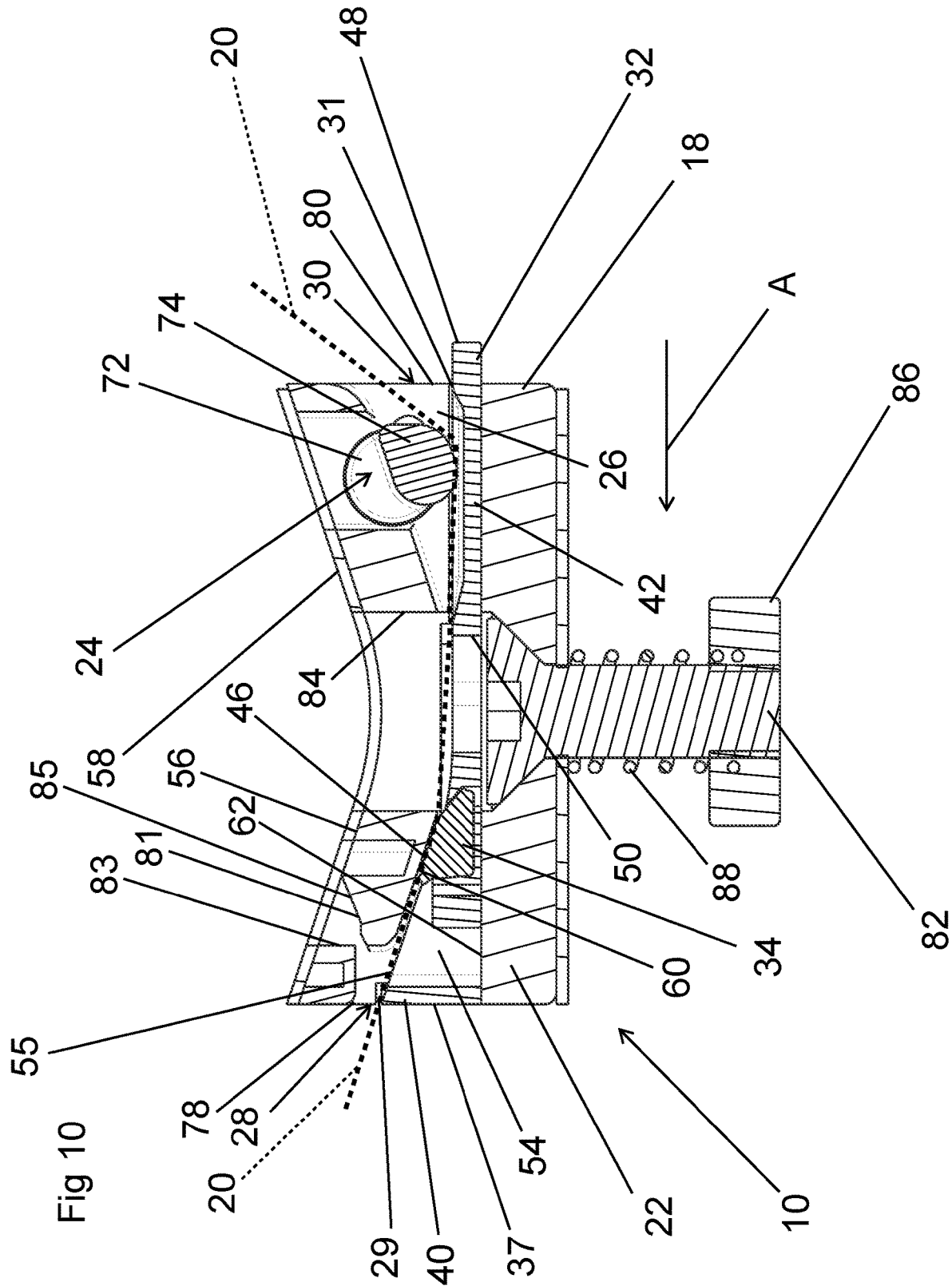
FIG. 10 is a sectional view of the clamping arrangement, showing the clamping element in a clamping position, and the tightening element in a tightened position.

The edge region 49 can be pressed by the user to move the release portion 42 towards the reaction member 40, as indicated by the arrow A in FIGS. 8, 10 and 14. As explained below, this has the effect of moving the clamping element to the non-clamping position (shown in FIG. 13), by releasing the clamping element 34 from clamping engagement with the flexible elongate member 20.

The release portion 42 defines a through aperture 50, the purpose of which is described below.

Figure 5:
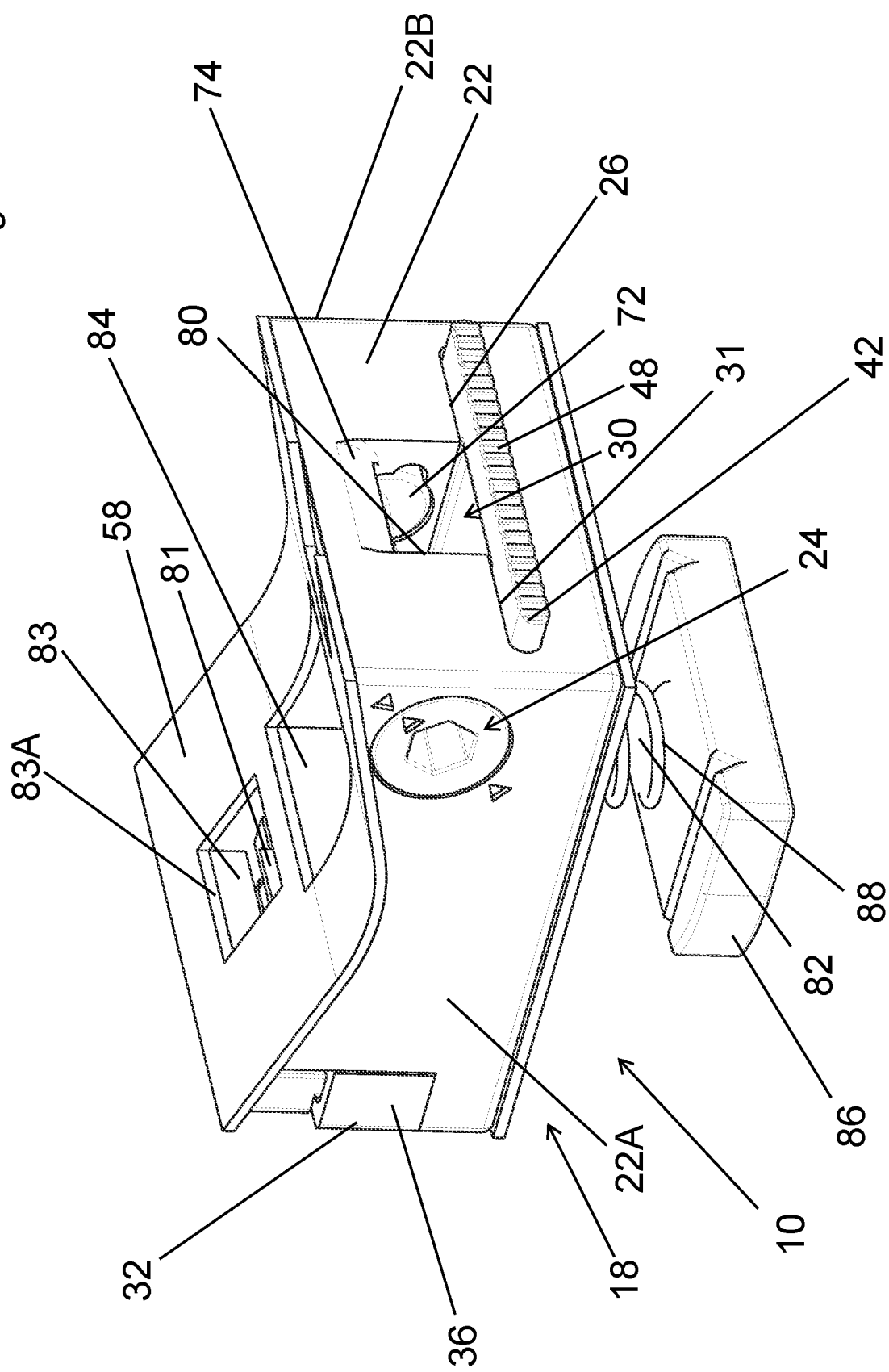
FIG. 5 is a further perspective view of the clamping arrangement, from the same side as shown in FIG. 4.
Figure 6:
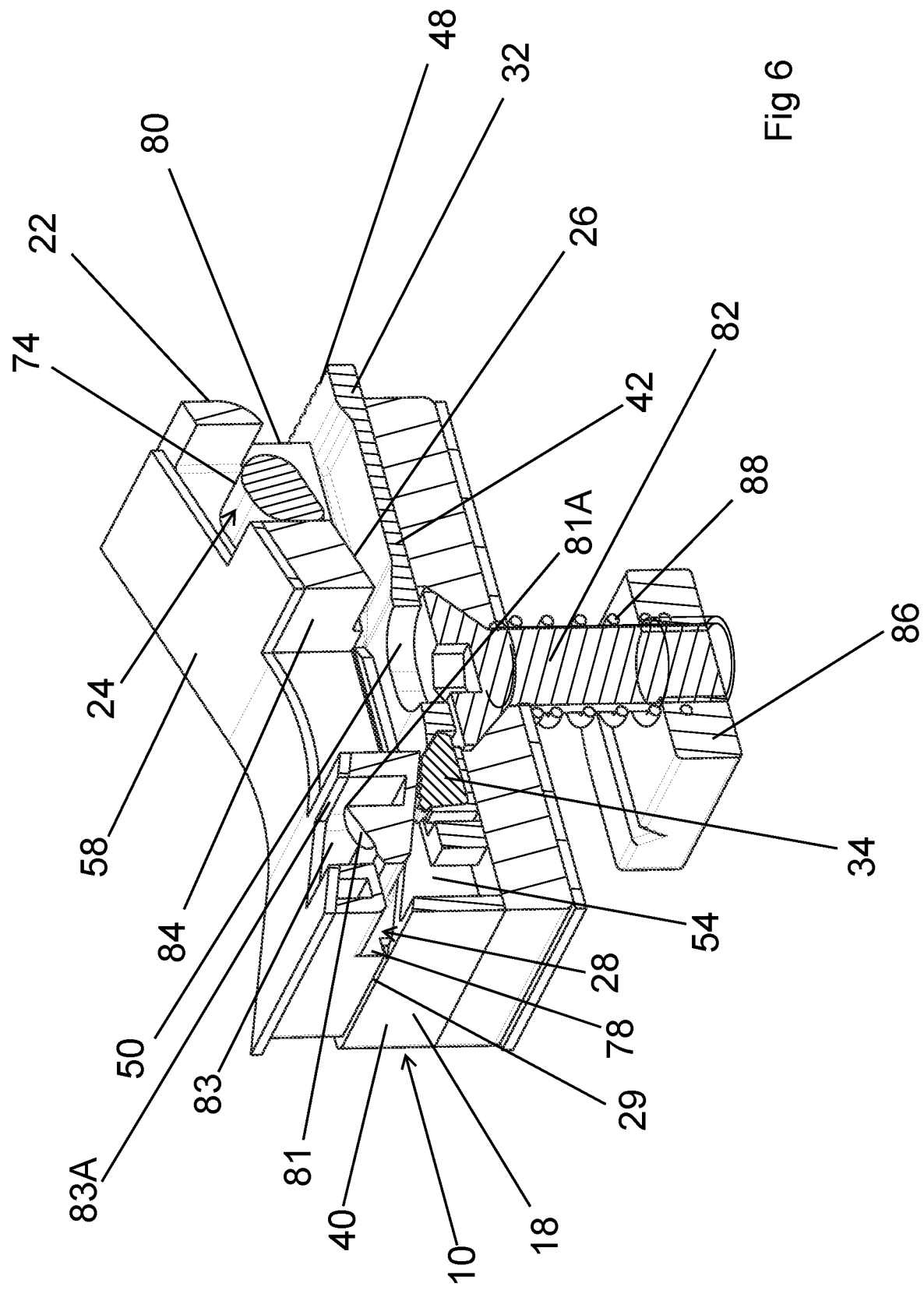
FIG. 6 is a sectional view of the clamping arrangement, from the same side as shown in FIG. 4.
Figure 7:
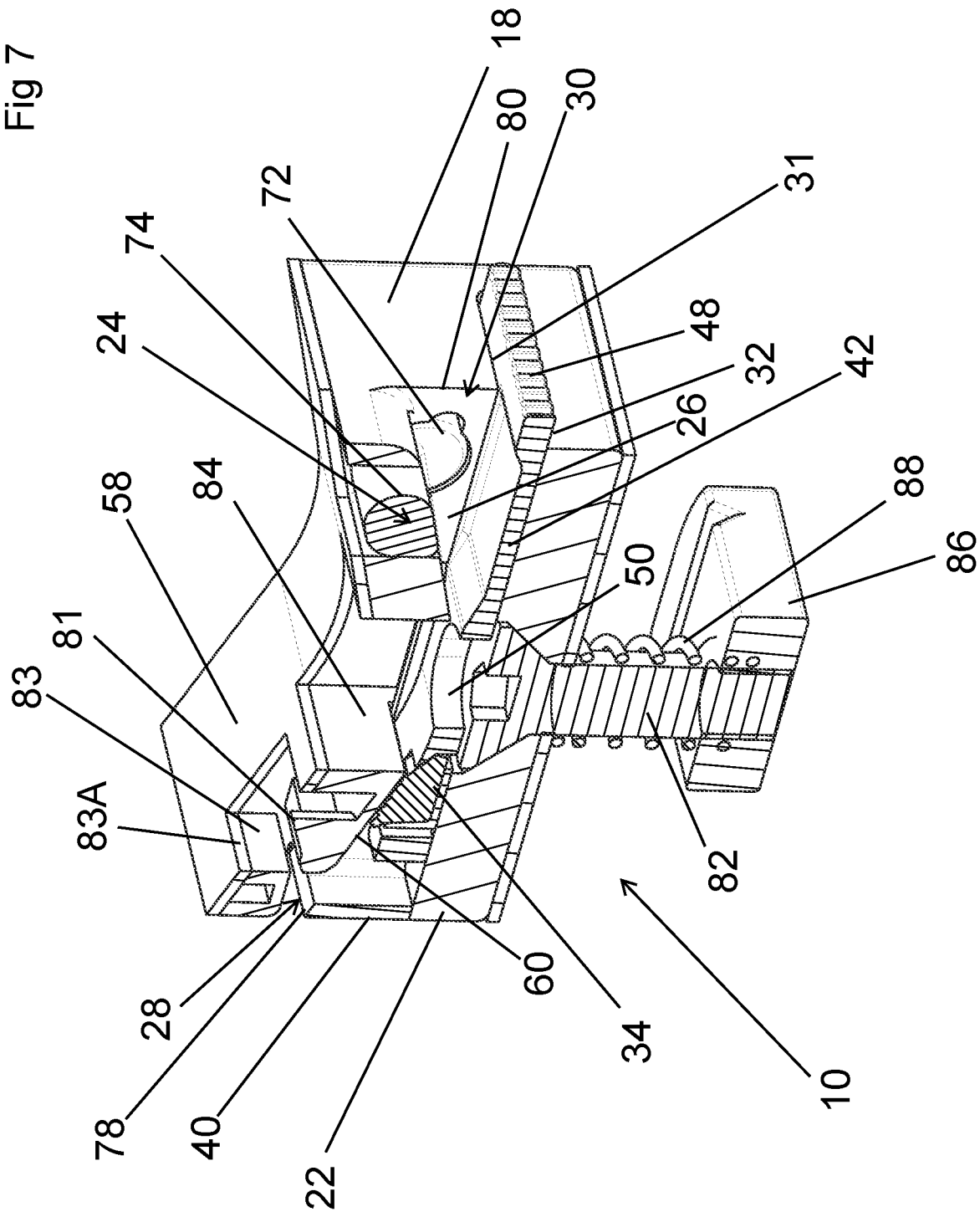
FIG. 7 is a further sectional view of the clamping arrangement, from the same side as shown in FIG. 4.

The body 22 also defines a first access region 78 of the first opening arrangement 28 (see FIG. 4), and a second access region 80 of the second opening arrangement 30 (see FIG. 5). The first and second access regions 78, 80 are provided to allow access of the flexible elongate member 20 to the internal space 26. The first access region 78 communicates with the first carriage receiving region 29. The second access region 80 communicates with the second carriage receiving region 31.

The carriage 32 further includes a ramp formation 52 arranged between the clamping element 34 and the reaction member 40. The ramp formation 52 comprises two ramps 54 which extend adjacent the clamping element 34 on opposite sides thereof.

The body 22 has a V shaped upper holding portion 56 (see FIGS. 8 to 11) for holding the article 12. An upper resilient member 58 is adhered to the holding portion 56. The upper resilient member 58 is deformable to adopt the shape of the holding portion 56.

The upper resilient member 58 is resiliently compressible when the flexible elongate member 20 is tightened around the article 12 thereon. This has the effect of preventing over tightening of the flexible elongate member 20 around the article 12. In addition, the upper resilient member 58 provides greater friction than the holding portion 56, thereby reducing longitudinal movement of the article 12.

The body 22 includes a clamping surface 60 against which the flexible elongate member 20 can be clamped by the clamping element 34. When so clamped, the flexible elongate member 20 is held between the clamping face 46 of the clamping element 34 and the clamping surface 60 of the body 22. The body 22 also includes an engaging surface 62 for engaging the clamping element 34 to provide a clamping force on the clamping element 34 when the clamping element 34 clamps the flexible elongate member 20.

Each of the ramps 54 has a ramped surface 55 to guide the flexible elongate member 20 from the clamping element 34 to the exit region 78. As shown in FIGS. 8 and 10, when the clamping element 34 is in the clamping position each of the ramped surfaces 55 of the ramps 54 is disposed further from the clamping surface 60 of the body 22 than the clamping face 46 of the clamping element 34.

Conversely, as shown in FIG. 13, when the clamping element 34 is moved to the non-clamping position, the clamping face 46 of the clamping element 34 is disposed further from the clamping surface 60 of the body 22 than each of the ramped surfaces 55 of the ramp 54. This allows the clamping face 46 to be fully disengaged from the flexible elongate member 20 when the clamping element 34 is in the non-clamping position.

The clamping surface 60 is a surface defining part of the internal space 26. As can be seen from FIG. 8, the clamping surface 60 is sloped relative to the release portion 42 of the carriage 32. The clamping surface 60 extends at substantially the same angle as the clamping face 46 of the clamping element 34. In use, the flexible elongate member 20 is clamped by the clamping element 34 between the clamping face 46 and the clamping surface 60.

Figure 11:
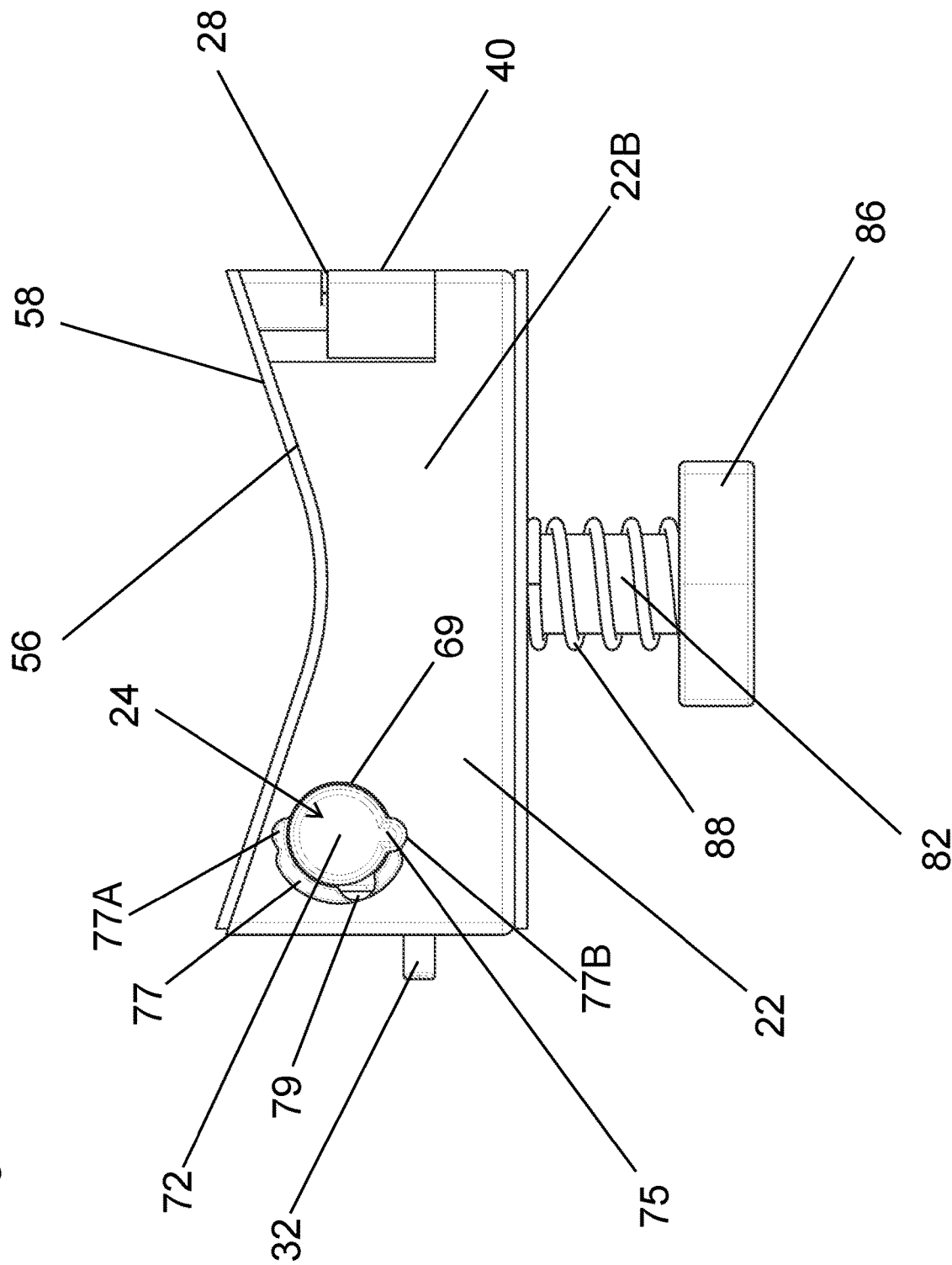
FIG. 11 is a view of the clamping arrangement from the opposite side to that shown in FIG. 10, showing the tightening element in a tightened position.
Figure 12:
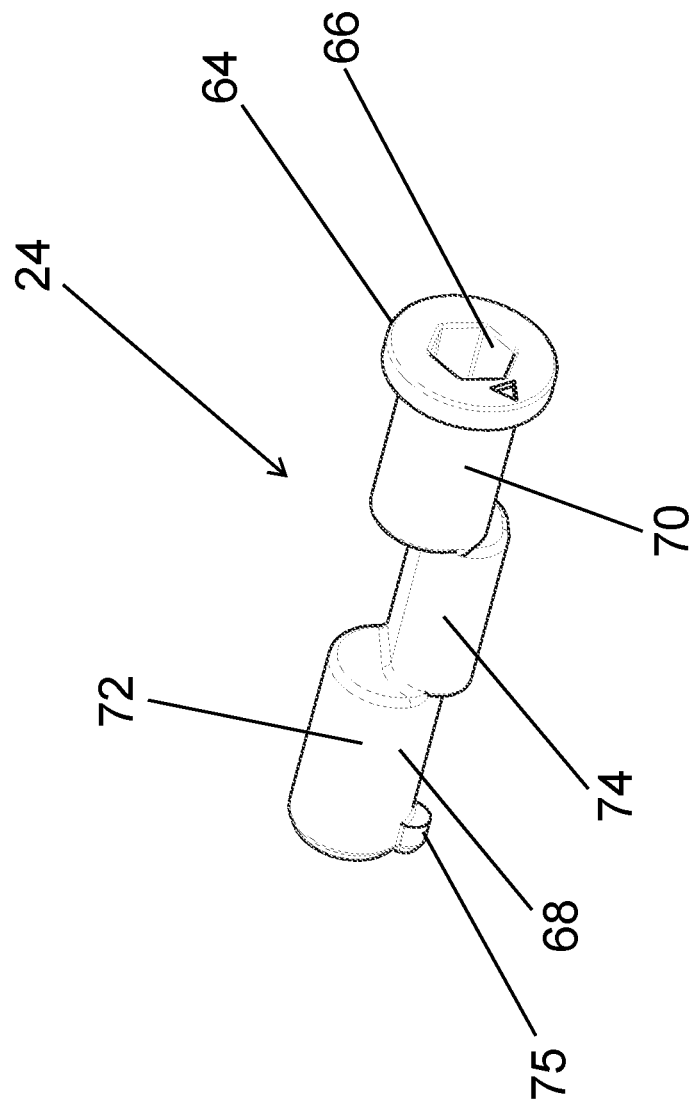
FIG. 12 is a perspective view of the tightening element.

The tightening element 24 is shown in more detail in FIG. 12, and comprises a bolt insertable into the body 22 at a region over the release portion 42 of the carriage 32. The tightening element 24 comprises a head 64 defining a receiving formation in the form of a hexagonal recess 66 for receiving a key with a hexagonal end profile, such as an Allen key. This allows the tightening element 24 to be rotated between a non-tightened position shown in FIGS. 8, and 9, and a tightened position shown in FIGS. 10 and 11.

The head 64 of the tightening element 24 could be provided with a different receiving formation, for example a slot to receive the end of a flat blade screwdriver, or a cross recess to receive the end of a cross head screwdriver, such as a Philips screwdriver.

In FIGS. 8, 10 and 13, the elongate member 20 is shown in broken lines. For reasons of clarity, in these Figures, only the regions of the elongate element 20 entering and exiting the body 22 are shown.

Referring to FIG. 12, the tightening element 24 comprises a shaft 68 having aligned proximal and distal portions 70, 72, the proximal portion 70 being provided at a proximal end of the shaft 68, adjacent the head 64. The distal portion 72 is spaced from the proximal portion 70 by a cam member 74. The cam member 74 is offset from the aligned proximal and distal portions 70, 72.

The distal portion 72 extends from the cam member 74 to a distal end of the shaft 68. A radially projecting lug 75 is provided on the distal portion 72 at the distal end of the shaft 68.

Figure 9:
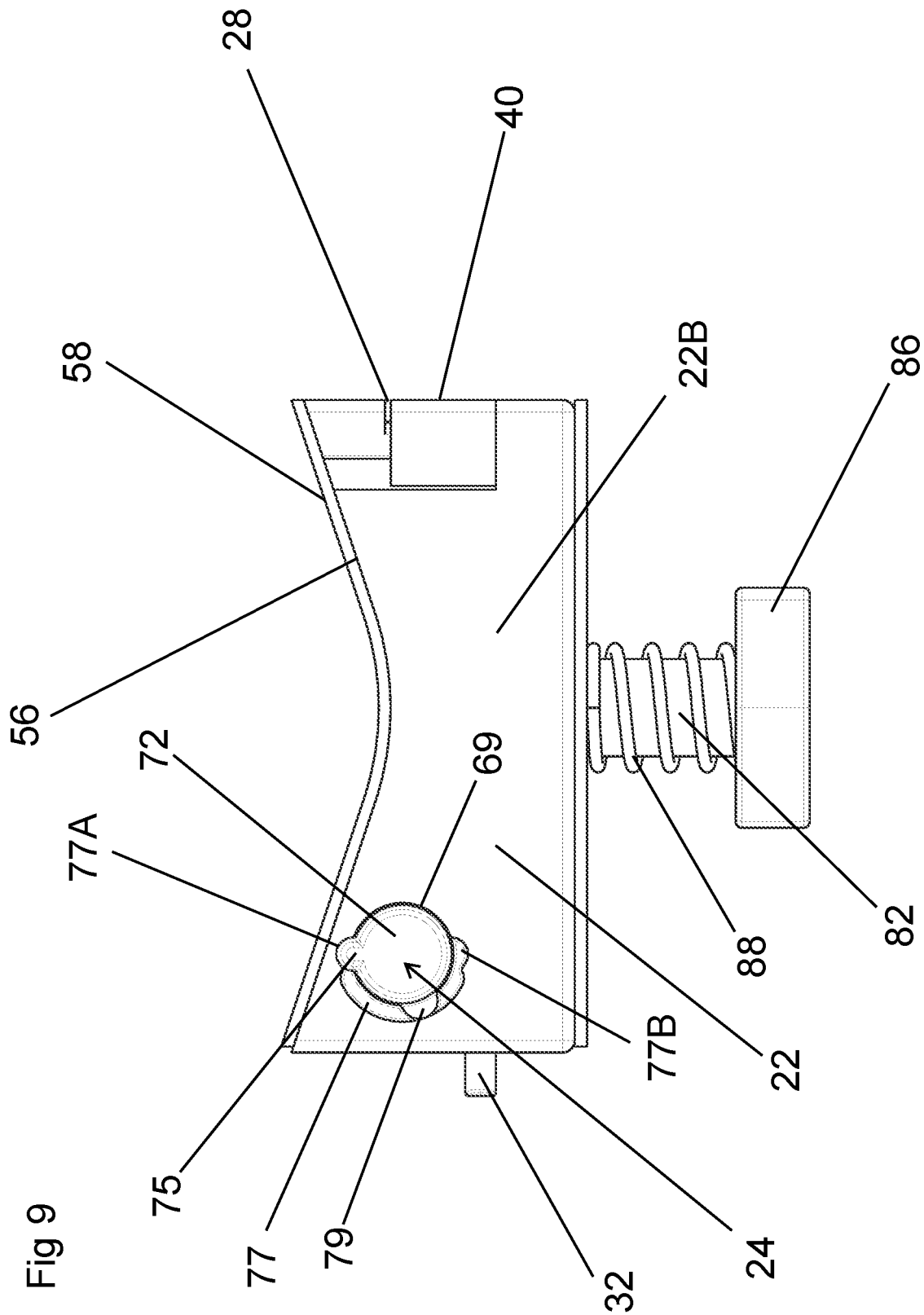
FIG. 9 is a view of the clamping arrangement from the opposite side to that shown in FIG. 8, showing the tightening element in a non-tightened position.

FIGS. 9 and 11 show the clamping arrangement 18 from the second side 22B of the body 22. The body 22 defines a through bore 69 for receiving the tightening element 24. A shoulder portion 77 is provided between the through bore 69 and the second side 22B. The shoulder portion 77 extends in a semi-circle around the through bore 69.

An elongate recess 79 extends from the shoulder portion 77 to the first side 22A. At each end of the shoulder portion 77, the second side provides notched regions 77A, 77B to hold the lug 75 and thereby hold the tightening element 24 in the non-tightened or tightened positions.

The tightening element 24 is inserted through the body 22 to a position in which the head 64 is flush with the first side 22A. On insertion, the tightening element is oriented so that the elongate recess 79 receives the lug 75 thereby allowing the tightening element 24 to be received in the through bore 69. When so received, the tightening element 24 is rotated about its main axis to the non-tightened position shown in FIGS. 8 and 9. In the non-tightened position, the lug 75 is received in the notched region 77A.

When it is desired tighten the elongate member 20 around the article 12, the user inserts a suitable driver into the hexagonal recess 68, and rotates the tightening element 24 about its main axis from the non-tightened position to the tightened position shown in FIGS. 10 and 11. In the tightened position, the lug 75 is received in the notched region 77B.

When the tightening element 24 is rotated to the tightened position, the cam member 74 is rotated into tight engagement with the flexible elongate member 20 when the flexible elongate member 20 is wrapped around the article 12 and clamped by the clamping element 34. This pushes the flexible elongate member 20, in the region of the cam member 74, towards the release portion 42. The effect is to pull the flexible elongate member 20 tightly around the article 12.

When the tightening element 24 is rotated to the non-tightened position, the cam member 74 is rotated out of engagement with the flexible elongate member 20 so that the tightening element 24 lets go of the flexible elongate member 20, causing the flexible elongate member 20 no longer to be in tight engagement with the article 12.

The body 22 and the flexible elongate member 20 include corresponding attaching formations to attach an end region 20A (FIGS. 24(i) to 29) of the flexible elongate member 20 to the body 22. The attaching formation of the flexible elongate member 20 is a hole 21 defined in the end region 20A thereof. The attaching formation of the body 22 is a projection 81 within the body 22. The projection 81 has an apex 81A (see FIG. 6).

The body 22 defines an access aperture 83 defined in the V shaped holding portion 56 to allow access to the end region 20A of the flexible elongate member 20.

A corresponding aperture 83A is defined in the upper resilient member 58. The corresponding aperture 83A is aligned with the aperture 83.

The access aperture 83 allows the user to install the end region 20A of the flexible elongate member 20 on the projection 81. The access aperture 83 communicates with the first access region 78 to allow the flexible elongate member 20 to extend from the projection 81 through the first access region 78.

Alternatively, the end region 20A of the flexible elongate member 20 may be installed on the projection 81 by the manufacturer. It will be appreciated that other forms of attaching formation could be used.

In use, the aforesaid end region 20A of the flexible elongate member 20 is fed through the first access region 78 over the projection 81. The projection 81 has an inclined surface 85 to engage the end region 20A of the flexible elongate member 20, and allow said end region 20A to slide across the projection 81. The user can then manipulate, via the access aperture 83, the end region 20A of the flexible elongate member 20 to arrange the end region 20A over the projection 81, so that the projection 81 is received through the hole 21 in the end region 20A. Thus, the flexible elongate member 20 extends from the body 22, exiting therefrom via the first access region 78.

The article 12 is then arranged on the upper resilient member 58 adhered to the V shaped holding portion 56. The flexible elongate member 20 is then wrapped around the article 12 and fed back into the body 22 via the second access region 80. The flexible elongate member 20 is then fed between the clamping element 34 and the clamping surface 60 of the body 22. The spring 44 pulls the clamping element 34 in the direction indicated by the arrow A, thereby clamping the flexible elongate member 20 between the clamping element 34 and the clamping surface 60.

The tightening element 24 is then rotated from the non-tightened position shown in FIG. 8 to the tightened position shown in FIG. 9. This rotation causes the cam member to engage the flexible elongate member 20, and tighten the flexible elongate member 20 against the article 12.

The connecting device 10 further includes a fastener comprising a countersunk bolt 82 to fasten the connecting device 10 to the support 12. The bolt 82 extends through the body 22 via an aperture 84 through the body 22. A nut 86 is provided on the bolt 82 so that when the bolt 82 is screwed into the nut 86, the nut 86 is driven into engagement with the return formations 16 of the support 14, thereby fastening the clamping arrangement 18 to the support 14.

The head of the bolt 82 has a receiving formation in the form of a hexagonal recess to receive a suitable driver in the form of a key with a hexagonal end profile, such as an Allen key. The aperture 50 through the release portion 42 of the carriage 32 provides access for the driver to the head of the bolt 82 to allow the bolt 82 to be screwed into the nut 86. The bolt 82 is provided with a compression spring 88 extending between the nut 86 and the body 22 to prevent the bolt 82 working itself loose.

The head of the bolt 82 could be provided with a different receiving formation, for example a slot to receive the end of a flat blade screwdriver, or a cross recess to receive the end of a cross head screwdriver, such as a Phifins screwdriver.

There is thus described a connecting device 10 that can attach an article 12, in the form of a pipe, to a support 14, in the form of a strut. The connecting device 10 can accommodate various different sizes of pipe in one product so the user does not need to stock several different sized devices. The connecting device 10 minimises the number of nuts and bolts used to clamp an article. Only two screws/bolts are used in the connecting device 10, i.e. the bolt 82 to fasten the clamping device 10 to the support 14, and the tightening element 24 to tighten the elongate member 20 around the article 12. In addition, the projecting edge region of the release portion 42 can be pressed to move the clamping element 34 out of engagement with the elongate member 20, thereby releasing the elongate member 20.

Various modifications can be made without departing from the scope of the invention.

Figure 15:
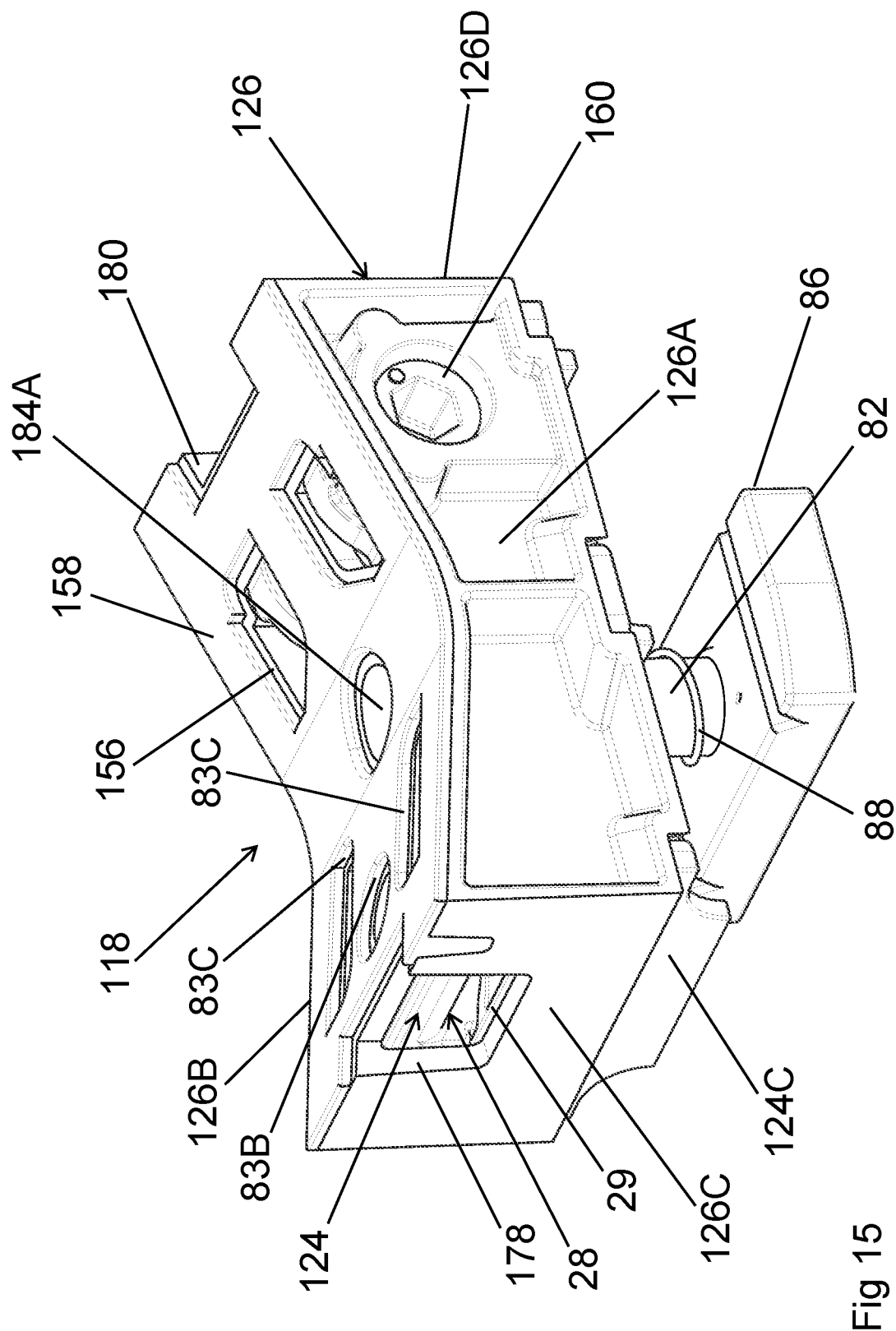
FIG. 15 is a side perspective view from one direction of a further clamping arrangement.
Figure 16:
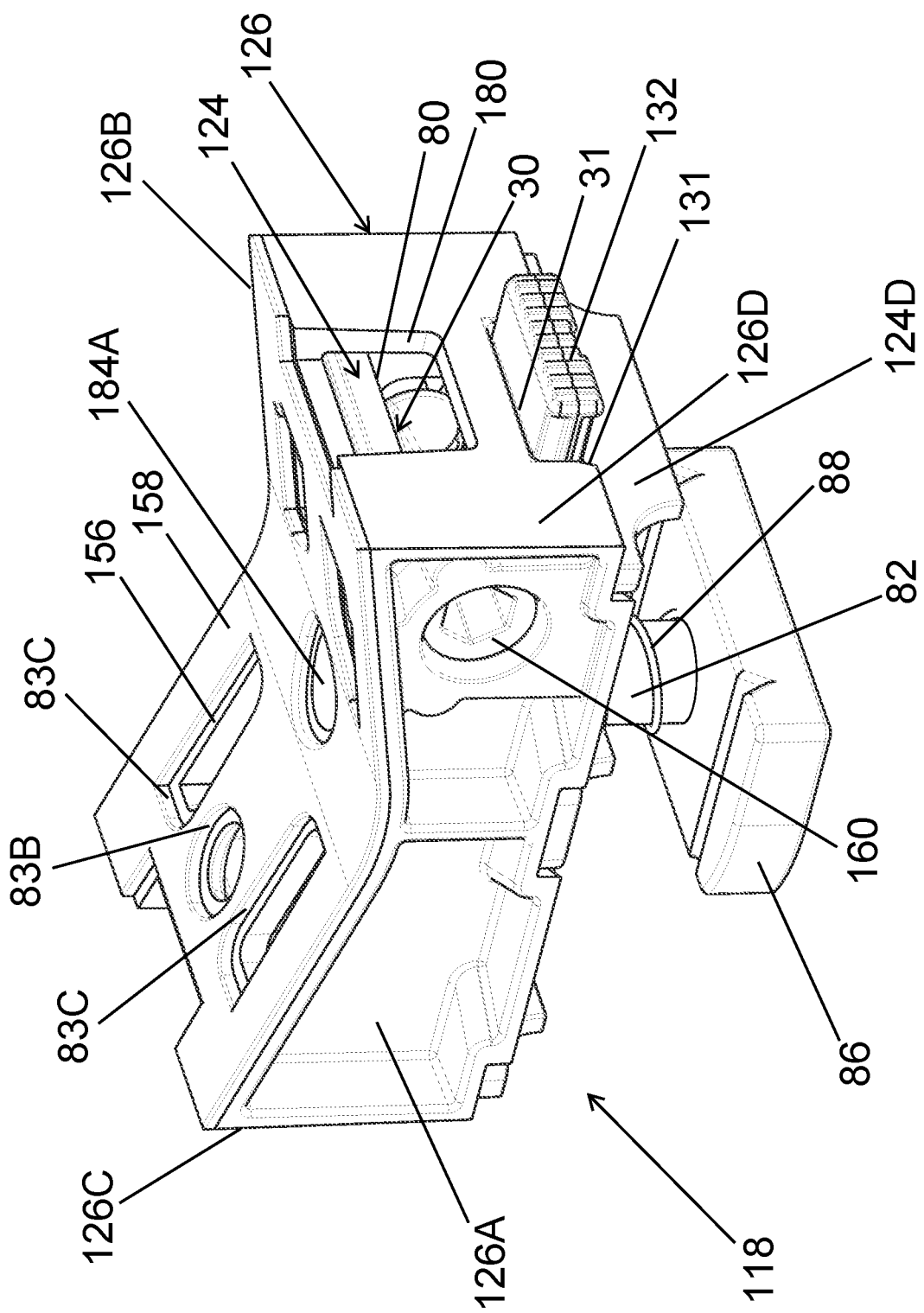
FIG. 16 is a side perspective view from another direction of the further clamping arrangement.
Figure 17:
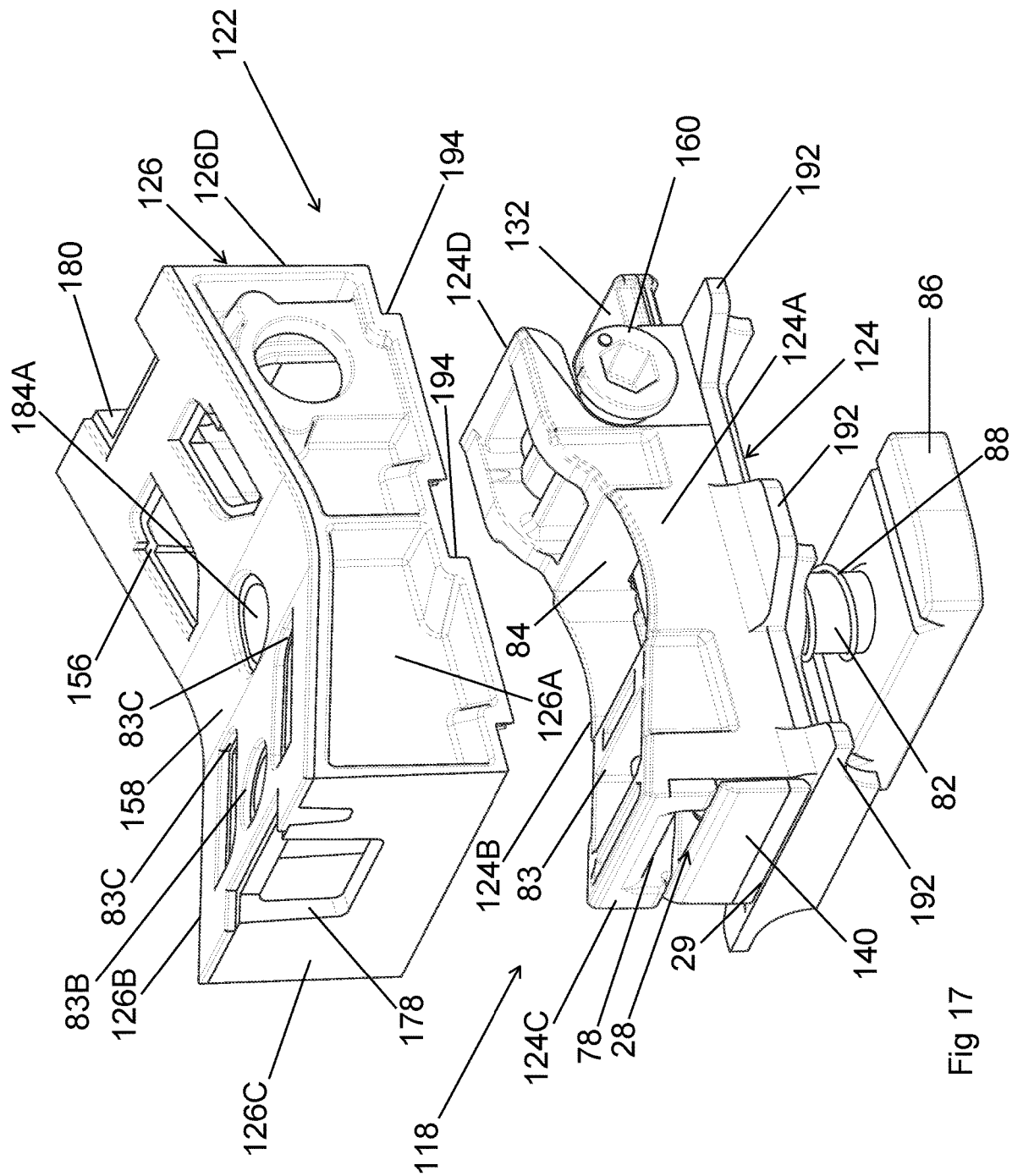
FIG. 17 is an exploded view of the further clamping arrangement.
Figure 18:
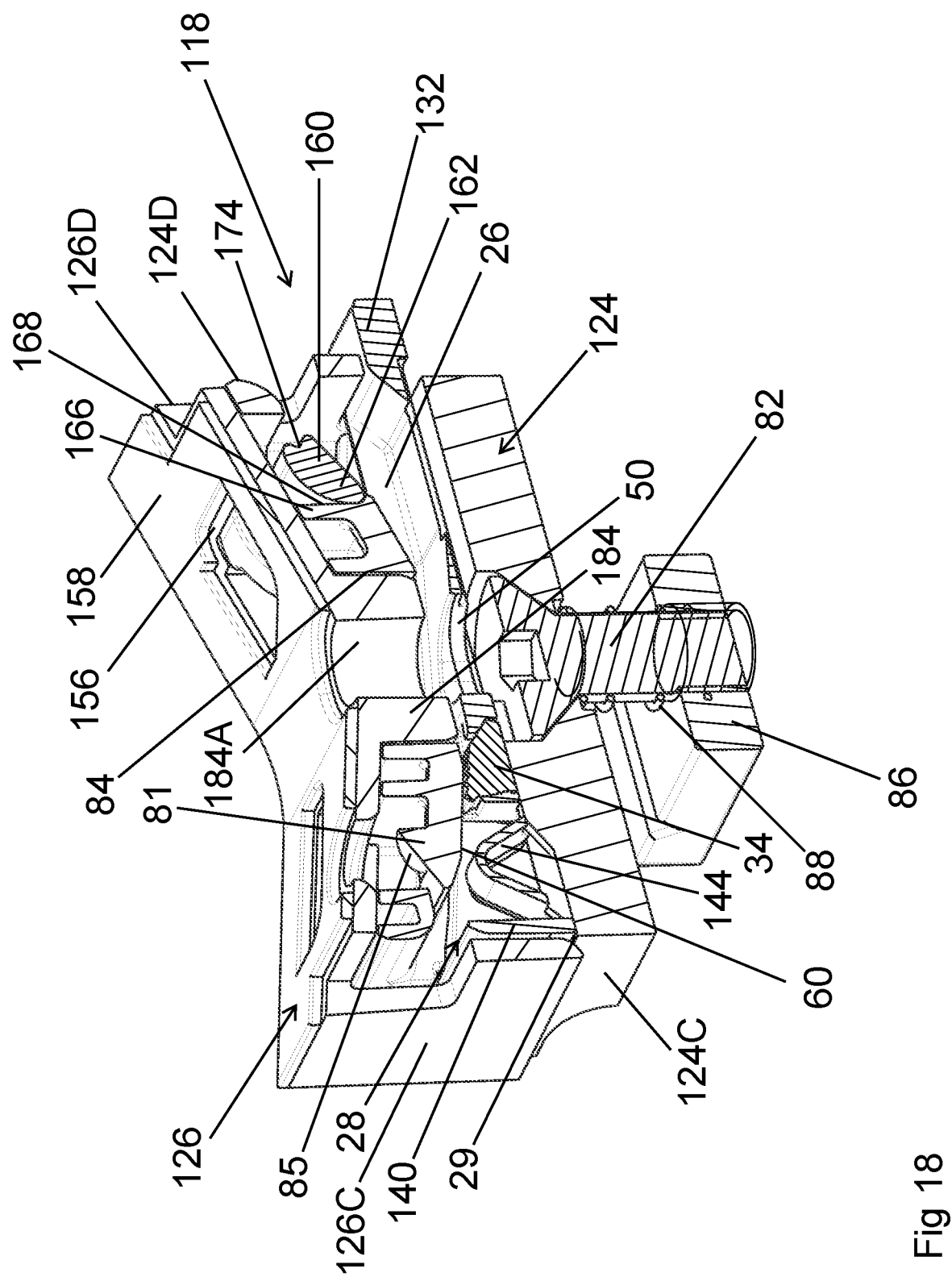
FIG. 18 is a sectional side perspective view from a first direction of the further clamping arrangement.
Figure 19:
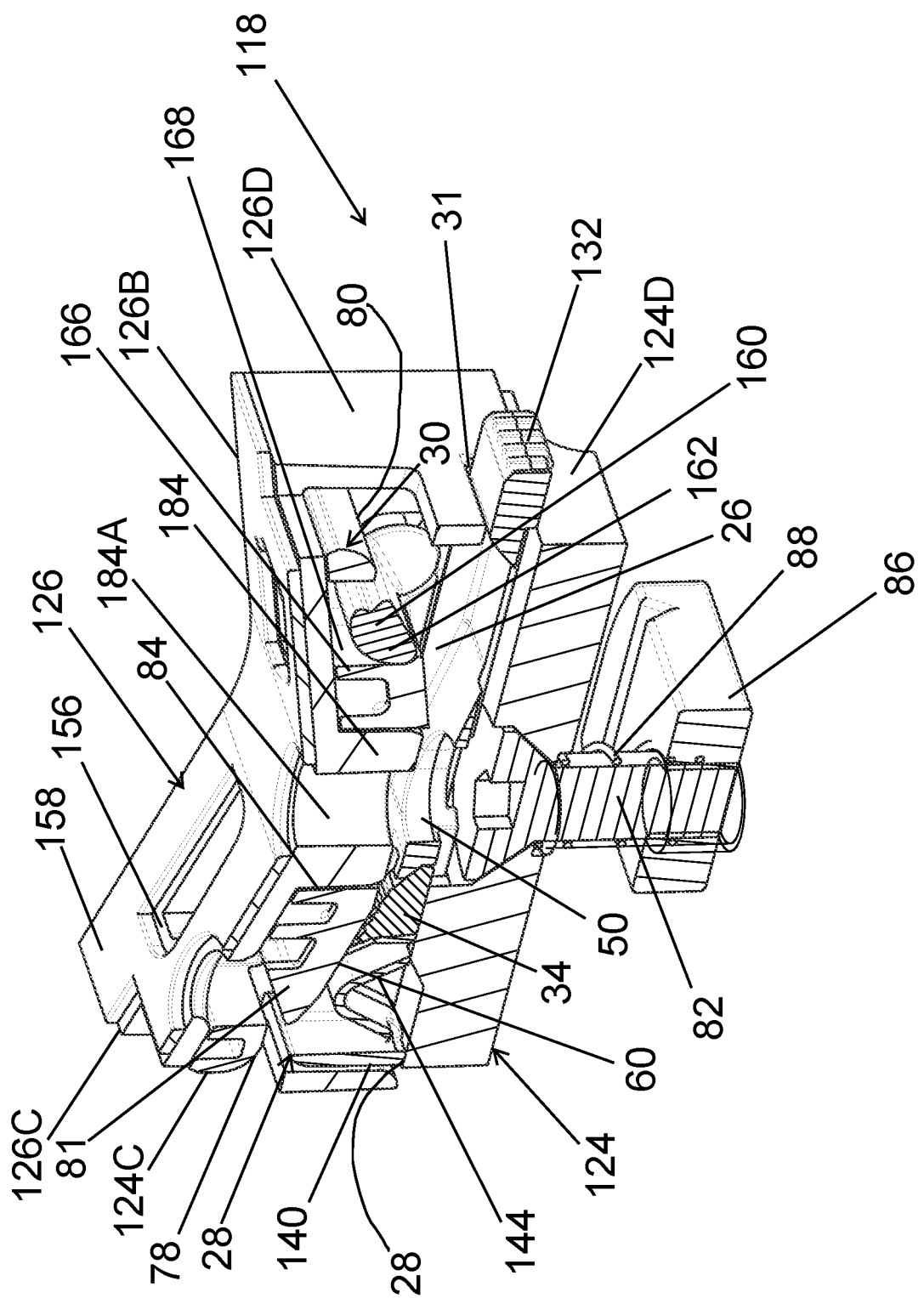
FIG. 19 is a sectional side perspective view from a second direction of the further clamping arrangement.

A second embodiment of the connecting device 10 is shown in FIGS. 15 to 32, comprising a clamping arrangement 118. FIGS. 15 to 17 show the clamping arrangement 118. FIG. 17 is an exploded view of the clamping arrangement 118, which comprises a body 122 formed of an inner main part 124 received by an outer cover part 126. The outer cover part 126 extends around the inner main part 124 when the outer cover part 126 receives the inner main part 124.

The clamping arrangement 118 comprises features of the clamping arrangement 18. Those features are designated with the same reference numerals as the corresponding features shown in FIGS. 1 to 14.

The inner main part 124 has the opposite first and second sides 124A, 124B, and front and rear faces 124C, 124D. The inner main part 124 defines the internal space 26 and the opposite first and second opening arrangements 28, 30. The inner main part 124 also defines the first and second carriage receiving regions 29, 31, and the first and second access regions 78, 80.

The outer cover part 126 comprises an upper resilient member 158 on an upper V shaped holding portion 156. The outer cover part 126 further includes downwardly extending side wall portions 126A, 126B, and front and rear wall portions 126C, 126D.

When the inner main part 124 is received within the outer cover part 126, the side wall portions 126A, 126B extend over the first and second sides 124A, 124B of the inner main part 124. The front and rear wall portions 126C, 126D extend over the front and rear faces 124C, 124D.

The front wall portion 126C defines a front opening 178, which aligns with the first access region 78 of the first opening arrangement 28 when the inner main part 124 is received within the outer cover part 126.

The rear wall portion 126D defines a rear recess 131 and a rear opening 180. When inner main part 124 is the received within the outer cover part 126, the rear recess 131 aligns with the second carriage receiving region 31, and the rear opening 180 aligns with the second access region 80 of the second opening arrangement 30.

There is no opening or recess in the front wall portion 126C to align with the first carriage receiving region 29 of the first opening arrangement 28. The purpose of the absence of such an opening or recess is discussed below.

In the second embodiment, the bolt 82 extends through the inner main part 124 to secure the clamping arrangement 118 to the support 14. The inner main part 124 defines the aperture 84 to allow the user to reach the bolt 82 with a suitable tool, such as a key with a hexagonal end profile. The outer cover part 126 includes a central bore portion 184 defining a through bore 184A. The central bore portion 184 extends through the aperture 84, as shown in FIGS. 18 to 23 and 25. Thus, the user can reach the bolt 82 with the tool via the through bore 184A.

Figure 24I:
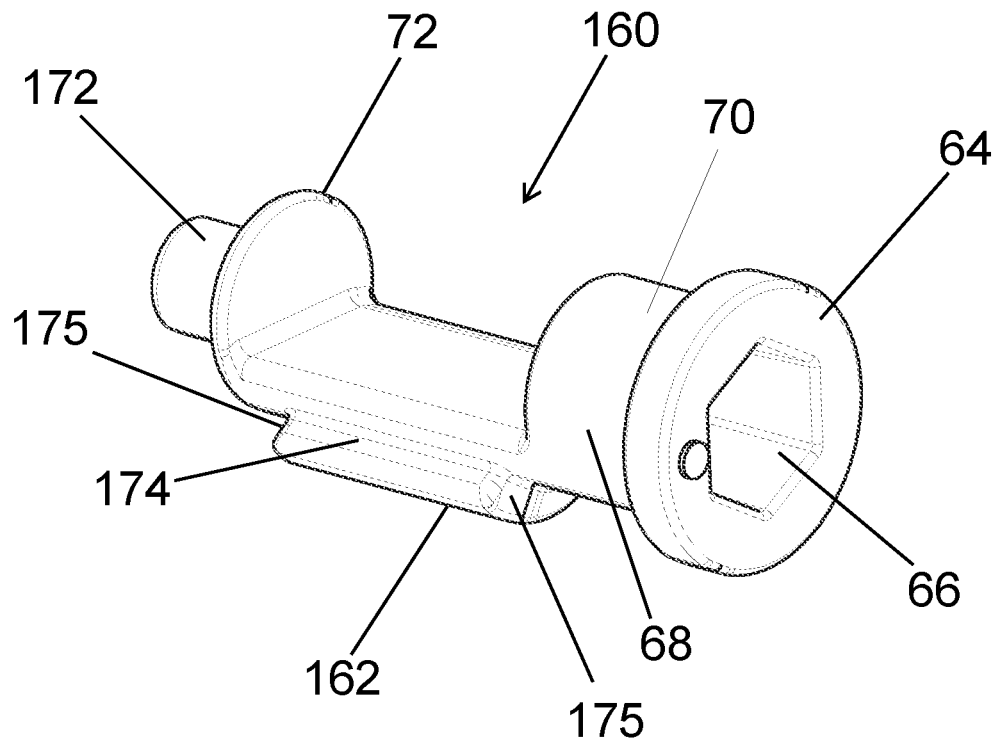
FIG. 24(i) is a perspective view from one direction of a further tightening element.
Figure 24:
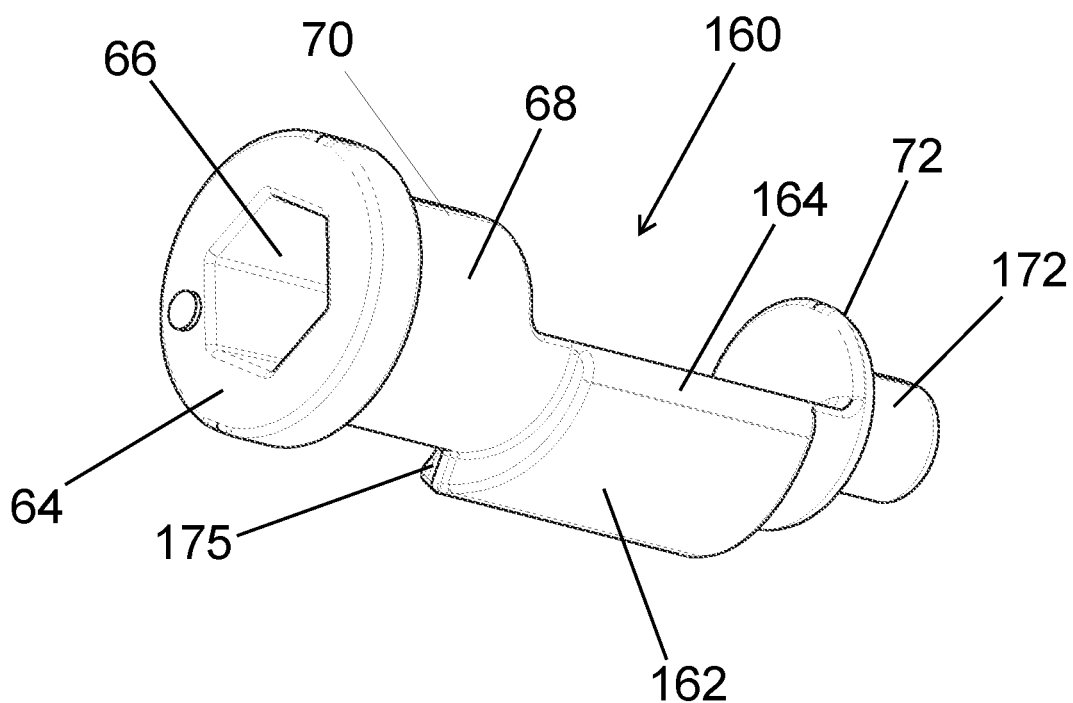
FIG. 24(ii) is a perspective view from the opposite direction of the further tightening element.

Referring to FIGS. 24(*i*) and 24(*iii*), there is shown another version of the tightening element, generally designated 160. The tightening element 160 is generally the same as the tightening element 24 shown in FIG. 12.

The features of the tightening element 160 which are the same as the features of the tightening element 24 in FIG. 12 are designated with the same reference numerals in FIGS. 24(*i*), and 24(*ii*) and 24(*iii*) as in FIG. 12.

The tightening element 160 differs from the tightening element 24 in that the radially projecting lug 75 is omitted. The tightening element 160 comprises a cam member 162 having a nose portion 164. The tightening element 160 further includes a locating member 172 at the distal portion 72. The locating member 172 constitutes a journal supported in an aperture in the side wall 124B.

The inner main part 124 includes an engaging portion 166 having a cam engaging surface 168 and a stop member 170. The stop member 170 extends from a lower edge of the cam engaging surface 168.

Figure 25:
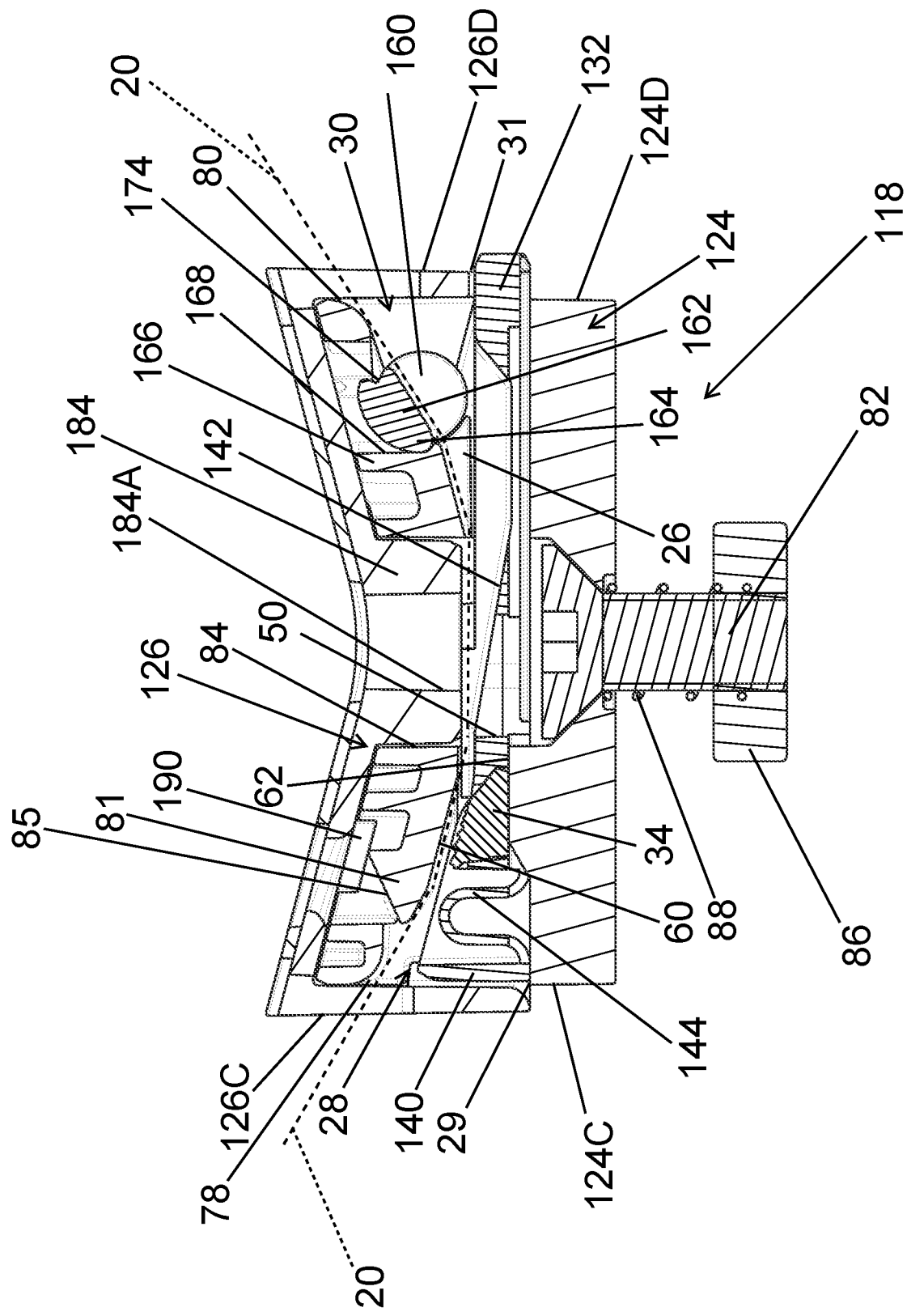
FIG. 25 is a sectional side view of the further clamping arrangement, showing a clamping element in a non-clamping position.
Figure 26:
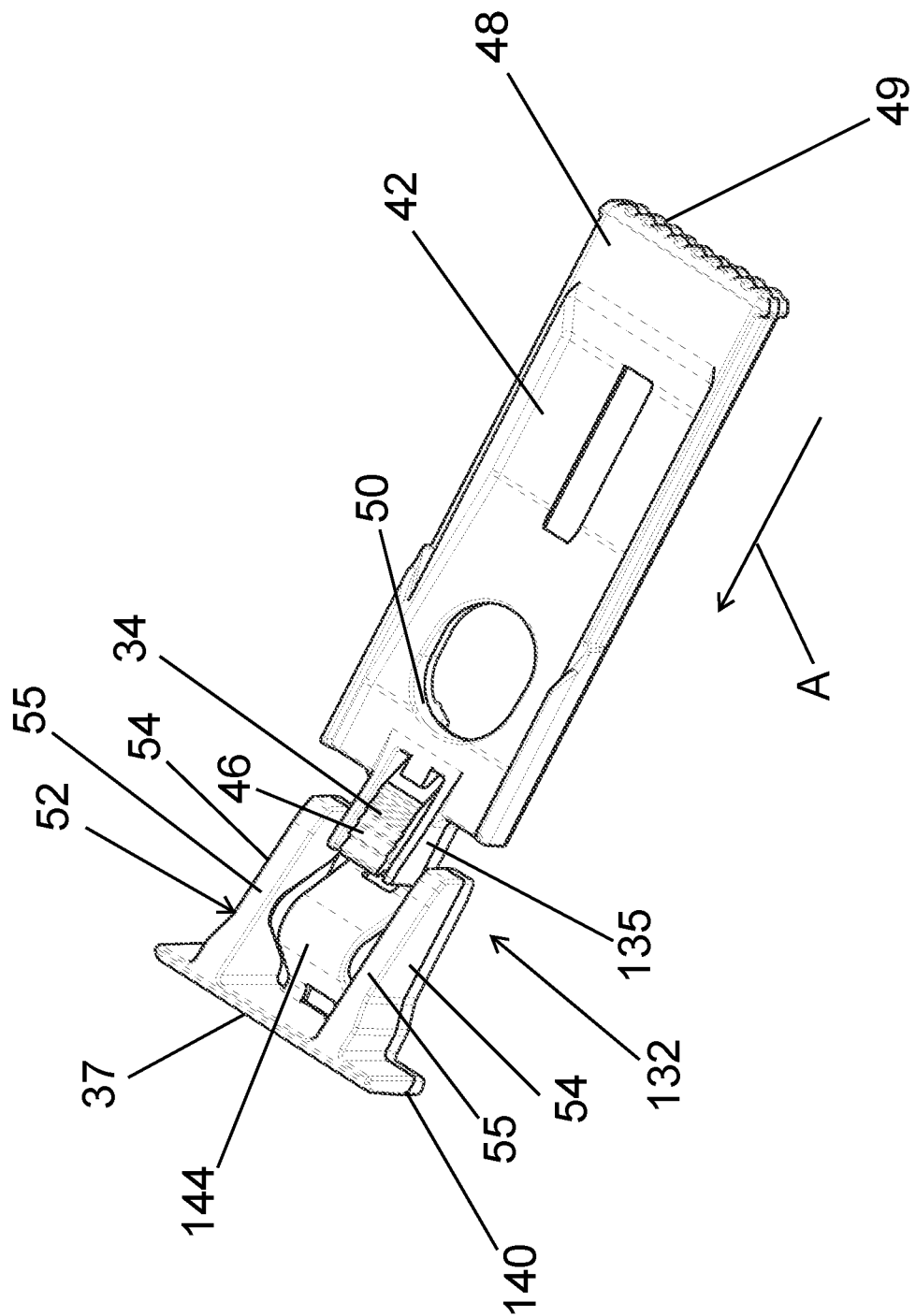
FIG. 26 is a perspective view of a further carriage incorporating the clamping element.

The cam engaging surface 168 and the stop member 170 define a cam receiving recess 173 therebetween for receiving the nose portion 164 when the tightening element 160 is in the non-tightened position, shown in FIGS. 22 and 25.

The cam member 162 defines an elongate stop recess 174 opposite the nose portion 164. When the tightening element 160 is in the tightened position, the stop recess 174 receives the stop member 170, thereby stopping the tightening element 160 from being rotated beyond the tightened position shown in FIG. 21.

The cam member 162 and the inner main part 124 comprise locking formations for locking the tightening element 160 in the non-tightened position. The locking formations comprise two indentations 175 defined by the cam member 162. The indentations 175 are defined at opposite ends of the elongate stop recess 174 defined by the cam member 162.

Figure 20:
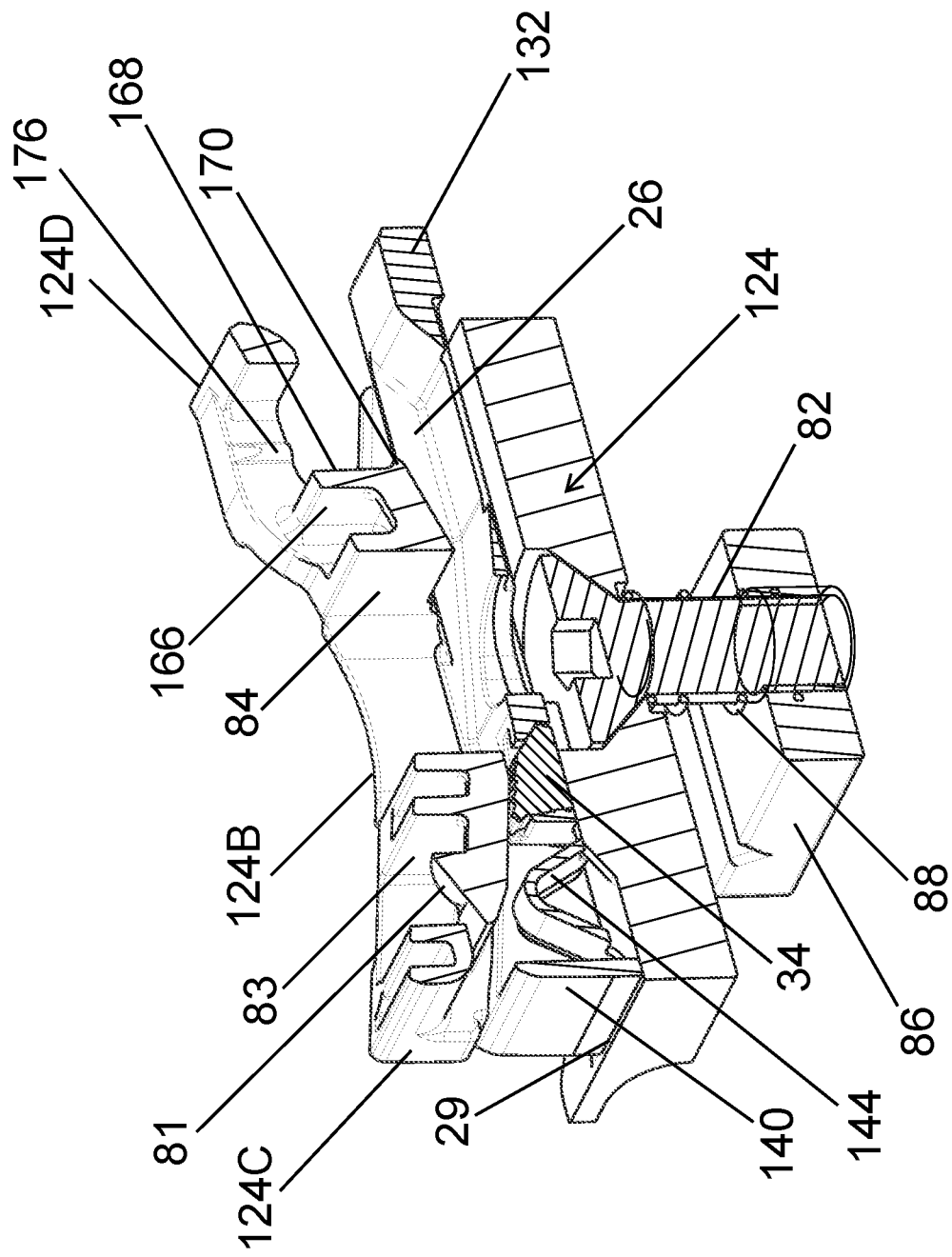
FIG. 20 is a sectional side perspective view from the first direction of an inner main part, being a component of the further clamping arrangement.
Figure 21:
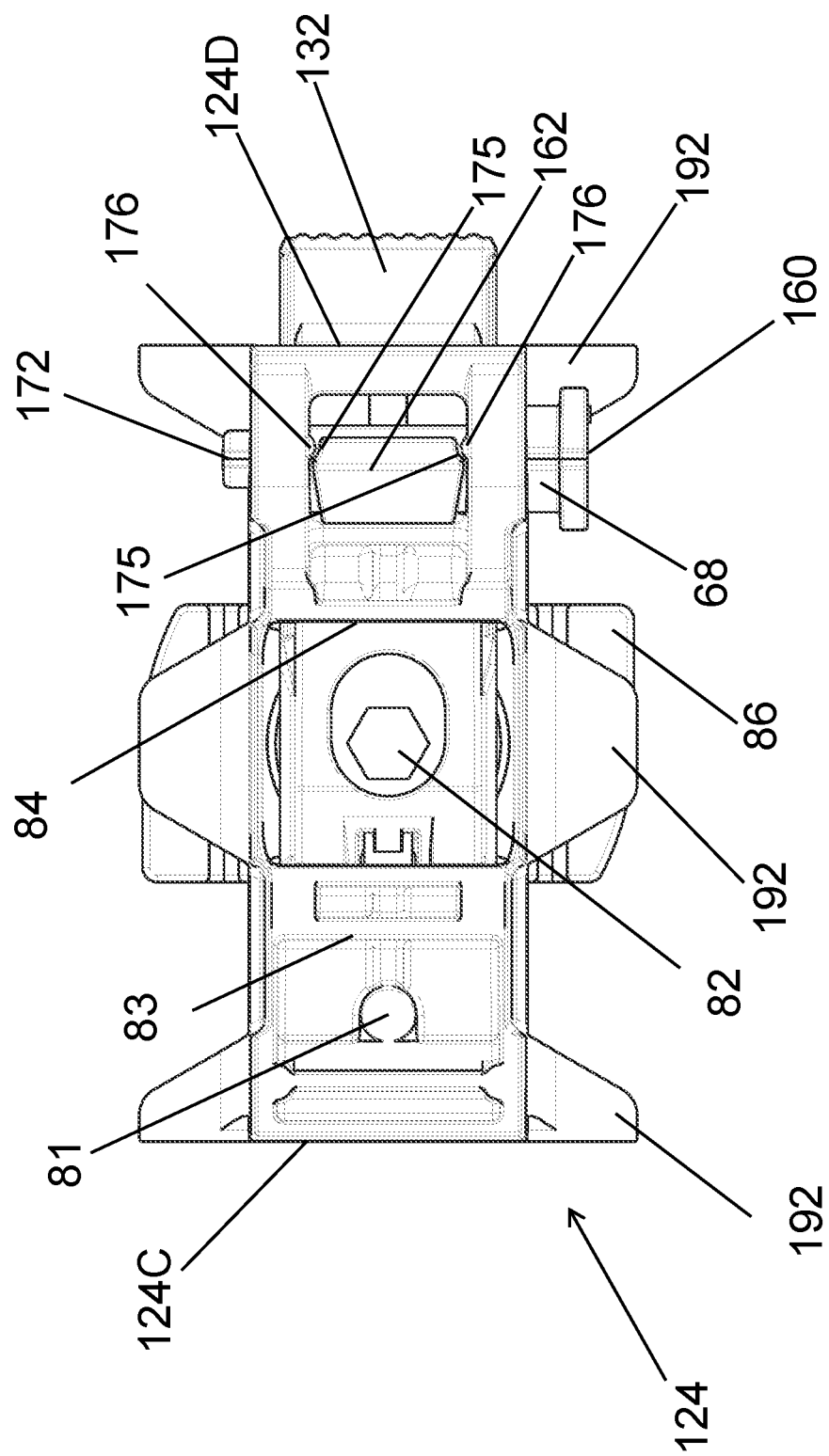
FIG. 21 is a top plan view of the inner main part shown in FIG. 20.

The locking formations may further include two protrusions 176 on the inner main part 124 (see FIGS. 20 and 21). The protrusions 176 are arranged on the opposite sides 124A, 124B of the inner main part 124.

The protrusions 176 are received in the indentations 175 when the tightening element 160 is in its non-tightening position, thereby locking the tightening element 160 in the non-tightening position.

A further modification comprises a carriage 132 (see FIG. 24). The carriage 132 can be used with either of the clamping arrangements 18 or 118, but is shown in use with the clamping arrangement 118. The carriage 132 is similar to the carriage 32 and carries the clamping element 34.

The carriage 132 is secured to the inner main part 124 of the body 122 by means of the outer cover part 126, as explained below.

An urging arrangement, in the form of a zig zag spring 144, is provided. The carriage 132 includes a reaction member 140 extending across the ramps 54.

The carriage 132 is held in the inner main part 124 by the front wall portion 126C of the outer cover part 126. The front wall portion 126C extends over the reaction member 140 in the first carriage receiving region 29 of the first opening arrangement 28. The absence of an aperture or recess in the front wall portion 126C aligned with said first carriage receiving recess 29 prevents the carriage 132 being removed from the inner main part 124.

The front wall portion 126C also provides an abutment for the reaction member 140, thereby allowing the reaction member 140 to apply a reaction force against the spring 144.

The carriage 132 further includes a release portion 142 on which the clamping element 34 is attached. The clamping element 34 is captive within a frame 135.

The release portion 142 is connected to the reaction member 140 by the spring 144. The spring 144 is aligned with the clamping element 34, and is oriented out of the plane of the release portion 142. The release portion 42 defines the through aperture 50.

The inner main part 124 includes the clamping surface 60 and the engaging surface 62 to clamp the flexible elongate member 20. The projection 81 is provided within the inner main part 124. The projection has a ramped surface 85 along which the end region 20A of the flexible elongate member 20 can slide.

Referring to FIG. 17, the inner main part 124 defines the access aperture 83 to allow access to the end region 20A of the flexible elongate member 20 when it is installed on the projection 81. A corresponding inner aperture 83B is defined in the outer covering part 126 and through the upper resilient member 158. The inner aperture 83B is aligned with the aperture 83.

The outer covering part 126 also defines two outer apertures 83C aligned with the aperture 83. The outer covering part 126 also has two elongate deflection formations, each deflection formation being in the form of a deflection rib 190 between the inner aperture 83B and the outer apertures 83C.

Each rib 190 has a lower edge 190A (see FIG. 30). The ribs 190 extend downwardly from the holding portion 156 through the aperture 83 on opposite sides of the projection 81. The ribs 190 are arranged such that the lower edge 190A of each rib 190 is substantially level with the apex of the projection 81.

FIGS. 27(i) to 27(vi) show the sequence for feeding the end region 20A of the flexible elongate member 20 into the inner main part 124 to receive the projection 81 in the hole 21 in the end region 20A of the flexible elongate member 20.

In FIG. 27(i), the flexible elongate member 20 is lined up with the first access region 78 of the first opening arrangement 28. In FIG. 27(ii), the flexible elongate member 20 is fed into the inner main part 124 via the first access region 78. The end edge of the flexible elongate member 20 at the end region 20A engages the inclined surface 85 of the projection 81.

FIG. 27(iii) shows the flexible elongate member 20 fed further into the inner main part 124. This causes the end region 20A to be deformed upwardly along the inclined surface 85. Further movement of the flexible elongate member 20 into the inner main part 124 moves the end edge 20B of the flexible elongate member 20 into engagement with the lower edge 190A of each of the ribs 190 (FIG. 27(iv)).

As the flexible elongate member 20 is pushed further along the inclined surface 85, the edge regions 20C at the end region 20A are deformed downwardly around the projection 81 by the ribs 190. This is shown in FIG. 27(v). FIG. 28 is a sectional perspective view of the view shown in FIG. 27(v).

FIGS. 29 to 31 show the deformation of the end region 20A of the flexible elongate member 20. FIG. 30 shows the projection 81 and the ribs 190 schematically in broken lines.

FIGS. 29 to 31 show the upward deformation of the end region 20A caused by its movement along the inclined surface 85. They also show the downward deformation of the edge regions 20C around the projection 81, caused by the ribs 190.

Further feeding of the elongate member 20 into the inner main part 124 urges the hole 21 over the apex 81A of the projection 81. The end region 20A moves downwards over the projection 81 as the projection 81 is received by the hole 21. Thus, the elongate member 20 is attached to the inner main part 124.

As indicated above, the lower edges 190A of the ribs 190 are substantially level with the apex of the projection 81. Therefore, when the end region 20A is mounted over the projection 81, with the projection 81 received in the hole 21, the end region 20A is prevented from detaching itself from the projection 81 by the ribs 190.

The inner main part 124 and the outer cover part 126 comprise cooperating affixing formations comprising a plurality of fins 192 at the lower edges of the first and second sides 124A, 124B, and a plurality of corresponding concavities 194 defined in the lower edges of the side wall portions 126A, 126B. The affixing formations further include snap fit members 194 on the lower edge of the side wall portions 126A. The snap fit members 194 are arranged to engage the lower edges of the first and second sides 124A, 124B, between the fins 192. When the inner main part 124 is received in the outer cover part 126, the fins 192 are received in the concavities 194, and snap fit members engage the under the edges of the first and second sides 124A, 124B, thereby affixing the outer cover part 126 to the inner main part 124.

In use, the weight of the article 12 clamped thereto, and/or the clamping force applied thereto by the flexible elongate member 20 ensure that the outer cover part 126 to the inner main part 124 are securely affixed to each other.

Many of the features of the embodiment shown in FIGS. 15 to 32 can be used in the embodiment shown in FIGS. 1 to 14 and vice versa. For example, the carriage 32 could be used in the clamping arrangement 118 with appropriate changes to the inner main part 124, or the carriage 132 could be used with the clamping arrangement 18 with appropriate changes to the body 22. As another example, the tightening element 24 could be used with the clamping arrangement 118 with appropriate changes to the inner main part 124, or the tightening element 160 could be used with the clamping arrangement 18 with appropriate changes to the body 22.

The invention claimed is:

1. A connecting device for connecting an article to a support, the connecting device comprising:
    a flexible elongate member; and
    a clamping arrangement for clamping the flexible elongate member around the article; the clamping arrangement comprising a body and a clamping element, the clamping element being movable between clamping and non-clamping positions;
    wherein, in the clamping position, the clamping element clamps the flexible elongate member to the body, thereby attaching the article to the clamping arrangement, and in the non-clamping position, the flexible elongate member is movable through the body;
    wherein the body and the flexible elongate member include corresponding attachments to attach an end region of the flexible elongate member to the body;
    wherein the clamping arrangement further includes a tightener for tightening the flexible elongate member against the article, the tightener being movable in engagement with the flexible elongate member to urge the flexible elongate member into tight engagement with the article; and
    wherein the tightener has a main axis about which the tightener is rotatable, and the tightener comprises a cam member, wherein the cam member is offset from the main axis, and the cam member extends radially outwardly to urge the flexible elongate member in a radially outward direction relative to the main axis during said rotation of the tightener.

2. A connecting device according to claim 1, wherein the body comprises an inner main part and an outer cover part, the inner main part having opposite first and second sides, and front and rear faces; and the outer cover part further including downwardly extending side, front and rear wall portions; the side wall portions extending over the first and second sides of the inner main part; and the front and rear wall portions extending over the front and rear faces.

3. A connecting device according to claim 1, wherein the body has a clamping surface against which the flexible elongate member can be clamped, and the clamping element comprises a clamping face to clamp the flexible elongate member against the clamping surface.

4. A connecting device according to claim 2, wherein the body has a clamping surface against which the flexible elongate member can be clamped, and the clamping element comprises a clamping face to clamp the flexible elongate member against the clamping surface, and wherein the clamping surface is provided in the inner main part of the body.

5. A connecting device according to claim 1, wherein one of the corresponding attaching formations comprises a hole defined by one of the flexible elongate member and the body, and the other of the attaching formations comprises a projection on the other of the flexible elongate member and the body.

6. A connecting device according to claim 1, comprising a fastening arrangement for fastening the clamping arrangement to the support, the fastening arrangement including an aperture defined through the body, and a fastener which can be inserted through the aperture in the body.

7. A connecting device for connecting an article to a support, the connecting device comprising:
   a flexible elongate member; and
   a clamping arrangement for clamping the flexible elongate member around the article; the clamping arrangement comprising a body and a clamping element, the clamping element being movable between clamping and non-clamping positions;
   wherein, in the clamping position, the clamping element clamps the flexible elongate member to the body, thereby attaching the article to the clamping arrangement, and in the non-clamping position, the flexible elongate member is movable through the body;
   wherein the body and the flexible elongate member include corresponding attachments to attach an end region of the flexible elongate member to the body;
   wherein the connecting device further includes a tightener for tightening the flexible elongate member against the article, the tightener being movable to engage the flexible elongate member and urge the flexible elongate member into tight engagement with the article; and
   wherein the connecting device comprises a carriage to carry the clamping element, the carriage including a spring arrangement, and the carriage further including a reaction member to apply a reaction force on the spring arrangement and enable the spring arrangement to urge the clamping element to the clamping position.

8. A connecting device according to claim 2, comprising a carriage to carry the clamping element, the carriage including a spring arrangement, and the carriage further including a reaction member to apply a reaction force on the spring arrangement and enable the spring arrangement to urge the clamping element to the clamping position, wherein the front wall portion extends across said reaction member, thereby securing the carriage in the body.

9. A connecting device according to claim 7, wherein carriage is substantially flat, and includes a holder for holding the clamping element, and the urging arrangement extends from the reaction member to the holder.

10. A connecting device according to claim 7, wherein the body defines a first opening arrangement through which the carriage can be inserted into the body, and the body defines a second opening arrangement through which the carriage extends when the carriage is received in the body.

11. A connecting device according to claim 10, wherein the second opening arrangement is opposite the first opening arrangement, and the carriage includes a release portion for moving the clamping element from the clamping position to the non-clamping position, the release portion extending through the second opening when the carriage is received in the internal space.

12. A connecting device according to claim 7, wherein the carriage includes a ramp formation to direct the flexible elongate member through the body, the ramp formation extending between the clamping element and reaction member.

13. A connecting device according to claim 1, wherein the tightener is held by the body, and the tightener is rotatable between a tightened position in which the tightener is tightened against the flexible elongate member, and a non-tightened position in which the tightener is not tightened against the flexible elongate member.

14. A connecting device according to claim 13, wherein the tightener includes a shaft aligned with the main axis.

15. A connecting device according to claim 14, wherein the body includes an engaging portion having a cam engaging surface for engaging the cam member, and wherein the engaging portion further includes a stop member extending from the cam engaging surface, the stop member engaging the cam member when the cam member is in the non-tightened position.

16. A connecting device according to claim 15, wherein the cam member comprises a nose portion, and wherein the cam engaging surface and the stop member define a cam receiving recess therebetween for receiving the nose portion when the tightener is in the non-tightened position.

17. A connecting device according to claim 16, wherein the cam member defines a stop recess opposite the nose portion, the stop recess being arranged to receive the stop member when the tightener is in the tightened position, thereby stopping the tightener from being rotated beyond the tightened position.

18. A connecting device according to claim 14, wherein the cam member and the body comprise locking formations for locking the tightener in the non-tightened position, the locking formations comprising an indentation on one of the tightener and the body, and a protrusion on the other of the tightener and the body.

19. A connecting device for connecting an article to a support, the connecting device comprising:
   a flexible elongate member;
   a body; and
   a clamping element, the clamping element being movable between clamping and non-clamping positions;
   wherein, in the clamping position, the clamping element clamps a first region of the flexible elongate member to the body, thereby attaching the article to the connecting device, and in the non-clamping position, the flexible elongate member is movable through the body;

wherein the body and the flexible elongate member include corresponding attachments to attach a second region of the flexible elongate member to the body; and wherein the connecting device further includes a tightener, the tightener being rotatable in engagement with a third region of the flexible elongate member to urge the flexible elongate member into tight engagement with the article; and wherein the tightener has a main axis about which the tightener is rotatable, and the tightener comprises a cam member, wherein the cam member is offset from the main, and the cam member extends radially outwardly axis to urge the flexible elongate member in a radially outward direction relative to the main axis during said rotation of the tightener.

20. A connecting device for connecting an article to a support, the connecting device comprising:

a flexible elongate member; and a clamping arrangement for clamping the flexible elongate member around the article; the clamping arrangement comprising a body and a clamping element, the clamping element being movable between clamping and non-clamping positions;

wherein, in the clamping position, the clamping element clamps the flexible elongate member to the body, thereby attaching the article to the clamping arrangement, and in the non-clamping position, the flexible elongate member is movable through the body;

a carriage to carry the clamping element;

wherein the carriage includes a release portion, wherein the release portion is pressable into the body to move the clamping element from the clamping position to the non-clamping position;

wherein the body defines an internal space to receive the carriage; and wherein the body defines a first and second opening arrangements to provide communication between the region external of the body and the internal space, whereby when the carriage is received in the internal space, the carriage extends through the second opening arrangement to provide the release portion.

21. A connecting device for connecting an article to a support, the connecting device comprising:

a flexible elongate member; and a clamping arrangement for clamping the flexible elongate member around the article; the clamping arrangement comprising a body and a clamping element, the clamping element being movable between clamping and non-clamping positions;

wherein, in the clamping position, the clamping element clamps a first region of the flexible elongate member to the body, thereby attaching the article to the clamping arrangement, and in the non-clamping position, the flexible elongate member is movable through the body;

wherein the body and the flexible elongate member include corresponding attachments to attach a second region of the flexible elongate member to the body;

wherein the clamping arrangement further includes a tightener for tightening the flexible elongate member around the article, the tightener being movable in engagement with the flexible elongate member at a third region of the flexible elongate member to urge the flexible elongate member into tight engagement around the article; and wherein the tightener has a main axis about which the tightener is rotatable, and the tightener comprises a cam member, wherein the cam member is offset from the main axis, and the cam member extends radially outwardly to urge the flexible elongate member in a radially outward direction relative to the main axis during said rotation of the tightener.

\* \* \* \* \*